(12) United States Patent
Kaji

(10) Patent No.: US 7,243,009 B2
(45) Date of Patent: Jul. 10, 2007

(54) PARAMETER OPTIMIZATION METHOD, PARAMETER OPTIMIZATION APPARATUS, PARAMETER OPTIMIZATION PROGRAM, AND MARINE VESSEL NAVIGATION CONTROL APPARATUS

(75) Inventor: Hirotaka Kaji, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 692 days.

(21) Appl. No.: 10/835,302

(22) Filed: Apr. 29, 2004

(65) Prior Publication Data

US 2004/0224577 A1  Nov. 11, 2004

(30) Foreign Application Priority Data

May 9, 2003  (JP)  ............... 2003-132258

(51) Int. Cl.
*G06F 19/00*  (2006.01)
(52) U.S. Cl. .................. 701/21; 703/2; 440/1
(58) Field of Classification Search .......... 701/1, 701/4, 21, 93, 96; 703/2; 440/1, 2, 113
See application file for complete search history.

(56) References Cited

U.S. PATENT DOCUMENTS

| | | | | |
|---|---|---|---|---|
| 4,931,025 A | * | 6/1990 | Torigai et al. ............ | 440/1 |
| 5,366,393 A | * | 11/1994 | Uenage et al. ............ | 440/1 |
| 5,785,562 A | | 7/1998 | Nestvall | |
| 6,458,003 B1 | | 10/2002 | Krueger | |
| 6,549,830 B2 | * | 4/2003 | Harada et al. ............ | 701/21 |
| 6,816,822 B1 | * | 11/2004 | Hess et al. ............... | 703/2 |
| 6,990,401 B2 | * | 1/2006 | Neiss et al. .............. | 701/96 |
| 2004/0193338 A1 | * | 9/2004 | Kaji ........................ | 701/21 |
| 2006/0229769 A1 | * | 10/2006 | Grichnik et al. .......... | 701/1 |

FOREIGN PATENT DOCUMENTS

| | | |
|---|---|---|
| JP | 63-038096 | 2/1988 |
| JP | 63-301196 | 12/1988 |
| JP | 05-008792 | 1/1993 |
| JP | 06-040391 | 2/1994 |
| JP | 08-040380 | 2/1996 |
| JP | 2001-152898 | 6/2001 |

OTHER PUBLICATIONS

Akira Todroki; "Introduction to Optimum Design of Nonlinear Problems Using Response Surface Methodology", Material for a Workshop of the Japan Society of Mechanical Engineers; 1999; partial translation.

(Continued)

*Primary Examiner*—Gary Chin
(74) *Attorney, Agent, or Firm*—Keating & Bennett, LLP

(57) ABSTRACT

A marine vessel navigation control apparatus includes a constant-speed navigation controller and a trim angle controller. The trim angle controller includes an evaluated-value calculation module which calculates evaluated values of a trim angle, an information storage medium, a statistical model creation module which creates a statistical model using the evaluated values stored in the information storage medium as an explained variable, and operation information including the trim angle as an explanatory variable, a target trim angle calculation module which calculates a target trim angle based on the statistical model, and a statistical model storage medium which stores parameters of the created statistical model.

32 Claims, 17 Drawing Sheets

OTHER PUBLICATIONS

Anthony A. Giunta et al.; "Implementation of a Trust Region Model Management Strategy in the Dakota Optimization Toolkit"; American Institute of Aeronautics and Astronautics; AIAA-2000-4935; pp. 1-8.

Hiroshi Hasegawa et al.; "A Simulation on Sequential Approximate Optimization Based Real Type Crossover Model and Response Surface Model"; Japan Society for Computational Engineering and Science; May 2000.

* cited by examiner

ANTECEDENT MEMBERSHIP FUNCTION

FUZZY RULE

ANTECEDENT MEMBERSHIP FUNCTION

FUZZY RULE

FIG.15A
s1=0.75
s2=1.20
s3=1.30
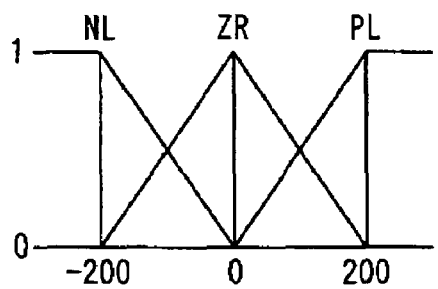 Xs1 → 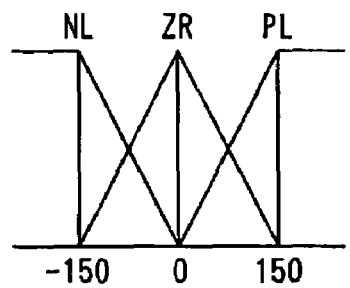
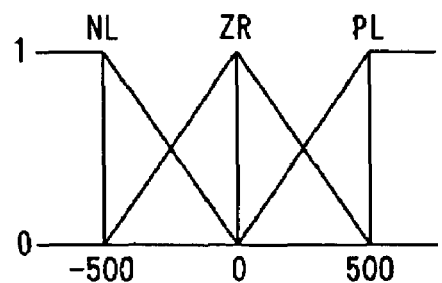 Xs2 → 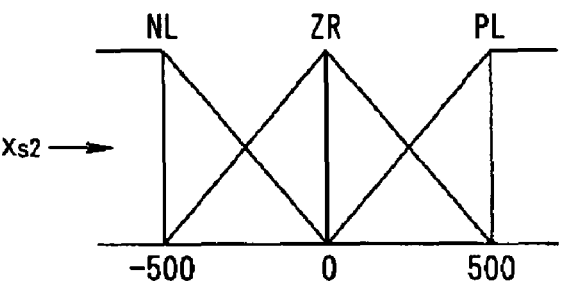
FIG.15B
|    | NL    | ZR     | PL     |
|----|-------|--------|--------|
| NL | 8.621 | 0.345  | -0.345 |
| ZR | 4.138 | 0.000  | -4.138 |
| PL | 0.345 | -0.345 | -8.621 |
Xs3 →
|    | NL     | ZR     | PL      |
|----|--------|--------|---------|
| NL | 11.207 | 0.449  | -0.449  |
| ZR | 5.379  | 0.000  | -5.379  |
| PL | 0.449  | -0.449 | -11.207 |

PARAMETER OPTIMIZATION METHOD, PARAMETER OPTIMIZATION APPARATUS, PARAMETER OPTIMIZATION PROGRAM, AND MARINE VESSEL NAVIGATION CONTROL APPARATUS

BACKGROUND OF THE INVENTION

1. Field of the Invention

The present invention relates to a method for optimizing parameters related to control processing by a control system. More particularly, the present invention relates to a parameter optimization method that is suitable for optimizing parameters in real time.

2. Description of the Related Art

Response surface methodology (RSM) has been well known as a technique for quickly determining a suboptimal solution to a parameter related to control processing by a control system for a marine vessel ("marine vessel" refers to a ship or a boat), automobile, or the like. The response surface methodology involves creating a statistical model called a response surface from sample values and performing optimization on the response surface. This methodology is useful when a gradient method cannot be used because a function to be optimized is not continuous or when simulations involve very high computational costs. Particular examples of this methodology, the Monte Carlo method and experimental design, are often used to obtain sample values efficiently (see Non-patent Literature 1).

Also, a technique has been proposed which involves collecting sample values around an optimum value estimated from an obtained response surface, creating a new response surface using the sample values, and thereby improving accuracy gradually. Since this technique creates a rough response surface initially and improves accuracy gradually by using sample values around the estimated optimum value, it can obtain a suboptimal solution quickly using a small number of samples.

For example, a technique called a sequential approximate optimization (SAO) (see Non-patent Literature 2) performs optimization in small regions called sub-regions using small-quantity sampling and response surfaces based on an experimental design, calculates accuracy from an estimated value obtained from a response surface of the optimized solution and an actual evaluated value, and obtains an optimum solution by repeating moves, contractions, and expansions of sub-regions according to the accuracy. Also, a technique which incorporates crossover used in real-coded genetic algorithms has been proposed for efficient sampling around an optimum solution (see Non-patent Literature 3 described below).

Generally, the response surface methodology and its modifications are recognized as techniques for optimizing large-scale simulations and real systems off-line, but they are also considered to be effective in optimizing real systems on-line in a short time.

In the following description, Non-patent Literature 1 refers to Todoroki: Introduction to Optimum Design of Nonlinear Problems Using Response Surface Methodology, material for a workshop of The Japan Society of Mechanical Engineers (1999); Non-patent Literature 2 refers to Guinta and Eldred: Implementation of a Trust Region Model Management Strategy in the DAKOTA Optimization Toolkit, paper AIAA-2000-4935 in Proceedings of the 8th AIAA/USAF/NASA/ISSMO Symposium on Multidisciplinary Analysis and Optimization, Long Beach, CA, Sep. 6-8 (2000); and Non-patent Literature 3, refers to Hasegawa, et al., A Simulation on Sequential Approximate Optimization-Based Real-type Crossover Model and Response Surface Model, Transactions of The Japan Society for Computational Engineering and Science, No. 20000019 (2000).

The techniques proposed so far, when used for on-line optimization of real systems, poses such problems as variation of sample values and deviation of an estimated solution due to a positional relationship between a sampling range and an optimum solution.

Regarding the variation of sample values, there is no need to take it into consideration in the case of simulations. When optimizing actual devices off-line, it is possible to create an experimental environment which enables stable measurements by minimizing observation errors.

However, when performing on-line optimization in a real environment, it is difficult to take stable measurements because of subtle variations in system operation caused by uncontrollable factors as well as because of noise added to measuring instruments. This results in a large variation of sample values with respect to the shape of a function to be optimized, adversely affecting the accuracy of response surfaces. In particular, failure of the system to operate properly due to an unexpected disturbance will produce outliers, which are known to adversely affect the creation of response surfaces by the least squares method.

Now, the deviation of an estimated solution due to the positional relationship between the sampling range and the optimum solution will be described. If sample values are collected with a parameter that is varied greatly when the system is actually operating, the system behavior may be changed greatly. In particular, if the system is used by people (e.g., a vehicle), this type of sampling is impossible. In such a case, an effective way is to start initial sampling in a small range in which somewhat stable operation is known to be available and estimate an optimum solution by increasing the sampling range gradually.

However, if a large noise is added to sample values and an optimum solution exists outside an initial sampling range, an estimated optimum solution is biased by the initial sampling range, making it impossible to obtain the true optimum solution.

This is because sample values collected near boundaries of the sampling range affect the shape of the response surface greatly. This can be seen, for example, from the fact that when impact of each sample value on the response surface is checked using Cook's distance in regression diagnostics given by Equation (1) below, the sample values near the boundaries have greater impact than those around the center.

Formula 1

$$\text{Cook's Distance} = \sum_{j=1}^{n} (yhat_{ji} - yhat_j)^2 / (p \cdot \sigma hat^2) \quad (1)$$

where $yhat_j$ is an estimated value of a response surface created using all the samples, $yhat_{ji}$ is an estimated value of a response surface created using all the samples except the i-th sample, p is the number of parameters in the model, and $\sigma hat^2$ is an estimated value of variance.

When an optimum value exists outside the initial sampling range, if sample values near the boundaries are far larger or far smaller than they should be due to the influence of noise, estimation accuracy of the optimum value will degrade greatly, which will have a fatal impact in on-line optimization in which the number of times of sampling is limited.

Thus, the response surface methodology and its modifications proposed conventionally cannot deal with the above-described problems for the reasons described above if final details of the system are undecided in the design phase although they are useful as an optimization technique for use before shipment.

Specifically, for example, it is difficult to predict before shipment what combination of an outboard device and hull the user will select and if the user intends to perform constant-speed navigation control or attitude angle control in a desired hull, it will become necessary to optimize system parameters after shipment. When using the Monte Carlo method or experimental design to obtain sample values for optimization, a problem arises as to how to set adjustable parameter ranges in which sample values are collected. If the ranges are too small, the true optimum solution cannot be obtained for the reasons described above and if they are too large, sharp changes may occur in the operation of the system, causing the system to behave unexpectedly. Also, since the weight and center of gravity of a system consisting of an outboard device and hull change greatly depending on the number of people aboard the marine vessel as well as on cargo, it is not true that once the system is optimized, it is always ready for operation, but the system must be optimized continuously.

SUMMARY OF THE INVENTION

In order to solve unsolved problems with conventional techniques such as those described above, preferred embodiments of the present invention provide a parameter optimization method, a parameter optimization apparatus, and a parameter optimization program which are suitable for real-time optimization of parameters related to control processing by a control system which controls a controlled object.

To achieve the advantages described above, a first aspect of various preferred embodiments of the present invention relates to a parameter optimization method for real-time optimization of parameters related to control processing by a control system which controls a controlled object in an environment in which control conditions change dynamically, the method including:
  a first step of setting an acquisition range of operation information about operation of the controlled object when calculating an initial evaluated value, based on a statistical model created in the past and stored in a storage medium;
  a second step of acquiring the operation information in a current environment;
  a third step of calculating an evaluated value to evaluate results of the control processing based on the acquired operation information;
  a fourth step of creating the statistical model using the calculated evaluated value as an explained variable, and the corresponding operation information as an explanatory variable;
  a fifth step of storing the created statistical model in the storage medium;
  a sixth step of calculating estimated values of the parameters which will provide an optimum solution in the stored statistical model; and
  a seventh step of updating the parameters used for the control processing based on the calculated estimated values of the parameters,
  wherein the parameters are optimized in real time through repetition of the second to seventh steps at time intervals after execution of the first step.

For example, when the controlled object is a marine vessel, a system which controls attitude angles of a hull and propeller can measure the attitude angles and specific fuel consumption during navigation as the operation information about operation of the marine vessel, create a statistical model based on the measured data, and estimate parameters related to control used in selecting the optimum attitude angle of the propeller with respect to the hull on the statistical model, and thereby select optimum attitude angles in a short period of time without being affected by disturbances at sea. Also, by determining an initial sampling range in subsequent optimization using the past statistical model (e.g., in such a way as to include past optimum solutions), it is possible to solve (or ease) problems caused by the positional relationship between sampling range and optimum solution.

Here, the controlled object may be anything, such as a marine vessel, aircraft, or automobile, which allows control-related parameters to be optimized based on a statistical model. The control system will preferably be a system for navigation speed control, attitude control, etc. in the case of a marine vessel; a system for flying speed control, attitude control, etc. in the case of an aircraft; or a system for a travel speed control, vehicle distance control, etc. in the case of an automobile. Control conditions for any of such systems vary greatly with various environmental conditions including weather.

Also, the statistical model describes an explained variable (also referred to as a criterion variable, an outcome variable, a response variable, or a dependent variable) regarded to be a random variable using explanatory variables (also referred to as independent variables) treated as non-random measured values or observed values. Known statistical models include response surface models, multiple regression models, discriminant models, classification trees (decision trees), autoregressive models, autoregressive moving average models, neural network models, etc.

A second aspect of various preferred embodiments of the present invention relates to the parameter optimization method according to the first aspect, wherein the acquisition range used to calculate the initial evaluated value is set to include an optimum solution to the statistical model created in the past.

That is, when calculating the initial evaluated value in the step of creating the statistical model, the acquisition range can be set to include operation information about operation of the controlled object used to obtain optimum values for the statistical model created in the past.

For example, by adjusting the acquisition range of initial sample values (the operation information) within the bounds of not making the operator uncomfortable based on a past statistical model, it is possible to improve the accuracy of the statistical model. Specifically, to take attitude angle control in a marine vessel as an example, since there is no statistical model at the initial stage, the trim angle is adjusted beginning with the full trim-in position. However, if a statistical model has been created once, an initial sampling range is determined using the past statistical model when newly creating a statistical model.

A third aspect of various preferred embodiments of the present invention relates to the parameter optimization method according to the first or second aspect, wherein the statistical model is generated preferably using a weighted least squares method or robust estimation method.

Since a weighted least squares method or robust estimation method is preferably used to create statistical models from sample values (operation information about operation of the controlled object), it is possible to create statistical models that are resistant to and robust against outliers.

Now, the weighted least squares method and robust estimation method will be described.

The ordinary least squares method estimates a statistical model parameter which minimizes a least mean square criterion given by Equation (2) below.

Formula 2

$$LMS = 1/n \sum_{i=1}^{n} (y_i - yhat_i)^2 \quad (2)$$

where n is the number of sample values, y is a sample value, and yhat is an output of the statistical model. Instead of LMS, the weighted least squares method estimates a statistical model parameter which minimizes a weighted least mean square criterion given by Equation (3) below.

Formula 3

$$LWS = 1/n \sum_{i=1}^{n} w_i (y_i - yhat_i)^2 \quad (3)$$

where $w_i$ is a weight used to adjust the effect of each sample on parameter estimation. For example, if it is known in advance that the variance $\sigma_2^2$ of a sample value $y_2$ at a value $x_2$ is smaller than the variance $\sigma_1^2$ of a sample value $y_1$ at a value $x_1$, it can be said that $y_2$ is a more accurate sample value. In such a case, if statistical model parameters are estimated using the LMS criterion described above, the estimation may not work well due to the effect of the less accurate sample value $y_1$. Using a weight of "$w_i = 1/\sigma_i^2$" can reduce the effect of sample values with large variance, and thus makes it possible to perform estimation effectively.

Various weighting methods such as the one described above have been proposed so far. Regarding the robust estimation method, for example, typical techniques include an LMedS (Least Median of Squares) technique, which estimates a statistical model that minimizes a least median of squares criterion given by Equation (4) below rather than the LMS criterion.

$$LMedS = median(y_i - yhat_i)^2 \quad (4)$$

where "median" means finding a median. For example, when estimating a linear model "$y = \alpha 0 + \alpha 1 x$" using three sample values including an outlier (a sample value containing an unexpectedly great noise), the magnitude of the outlier has a great effect if the LMS criterion is used, but with the LMedS criterion which involves determining a median, the magnitude of the outlier is irrelevant as can be seen from Equation (4). Thus, the LMedS criterion, which is not affected by any outlier, allows estimation to be performed effectively.

Besides the LMedS estimation method, the robust estimation method includes other estimation methods which utilize order statistics, such as the least quantile of squares (LQS) estimation method, least trimmed squares (LTS) estimation method, and M estimation method (a type of weighted least squares method).

A fourth aspect of various preferred embodiments of the present invention relates to the parameter optimization method according to any of the first to third aspects, wherein a genetic algorithm is preferably used as a solution to the robust estimation method.

First, genetic algorithms (GA) will be described. The genetic algorithms provide an optimization technique which simulates a process of organic evolution. They are applied to various optimization problems. The genetic algorithms are roughly divided into simple genetic algorithms in which the parameters to be optimized are represented by bit strings and real-coded genetic algorithms in which the parameters to be optimized are represented directly by real values. It is known that the real-coded genetic algorithms are highly effective in the optimization of functions. A real-coded genetic algorithm includes the following steps.

1. Initialization: Individuals are placed in a search space with random initial values assigned to them.
2. Selection: Individuals to be parents are selected from the population either at random or probabilistically according to fitness.
3. Crossover: Child individuals are generated using information about a plurality of parent individuals. Typical crossover techniques include unimodal normal distribution crossover (UNDX), blend crossover (BLX-α), etc.
4. Evaluation: Individuals are evaluated according to an evaluation function and screened, and then the processing returns to step 2 described above.

Now, description will be given of why genetic algorithms are suited to be a solution to robust estimation. To determine strict parameters for statistical models, the ordinary least squares method utilizes matrix calculation. However, when using this technique on a built-in microprocessor, if the degrees of statistical models are increased or a criterion other than the LMS criterion is used, it is difficult in terms of computation time and computational accuracy to determine parameters analytically. In such a case, it is useful to use an approximation method, typified by a steepest-descent method, which uses information about the slope of a function.

When an order statistic criterion such as an LMedS criterion is used, its function becomes multimodal and discontinuous. Thus, the use of an approximation method which uses information about the slope of a function results in local solutions, making it impossible to estimate optimum parameters. Therefore, an analytical solution based on such techniques has not been found.

The genetic algorithms, which provide an optimization technique based on direct searches without using information about the slope of a function, can estimate optimum parameters without being affected by the above-described problem.

Also, a fifth aspect of various preferred embodiments of the present invention relates to a parameter optimization apparatus for real-time optimization of parameters related to control processing by a control system which controls a controlled object in an environment in which control conditions change dynamically, including:

acquisition range setting means for setting an acquisition range of operation information about operation of the controlled object when calculating an initial evaluated value, based on a statistical model created in the past and stored by statistical model storage means;

operation information acquisition means for acquiring the operation information in a current environment;

evaluated-value calculation means for calculating an evaluated value to evaluate results of the control processing based on the operation information acquired by the operation information acquisition means;

statistical model creation means for creating the statistical model using the evaluated value calculated by the evaluated-value calculation means as an explained variable, and the corresponding operation information as an explanatory variable;

the statistical model storage means for storing the statistical model created by the statistical model creation means;

estimated value calculation means for calculating estimated values of the parameters which will be an optimum solution to the statistical model stored by the statistical model storage means; and parameter updating means for updating the parameters used for the control processing based on the estimated values of the parameters calculated by the estimated value calculation means.

With this configuration, the acquisition range setting means can set an acquisition range of operation information about operation of the controlled object when calculating an initial evaluated value, based on a statistical model created in the past and stored by statistical model storage means; the operation information acquisition means can acquire the operation information in a current environment; the evaluated-value calculation means can calculate an evaluated value to evaluate results of the control processing based on the operation information acquired in the current environment; the statistical model creation means can create the statistical model using the evaluated value calculated by the evaluated-value calculation means as an explained variable, and the corresponding operation information as an explanatory variable; the statistical model storage means can store the statistical model created by the statistical model creation means; the estimated value calculation means can calculate estimated values of the parameters which will be an optimum solution to the statistical model stored by the statistical model storage means; and the parameter updating means can update the parameters used for the control processing based on the estimated values of the parameters calculated by the estimated value calculation means.

Since this apparatus implements the parameter optimization method according to various preferred embodiments described above, description of its effects will be omitted to avoid redundancy.

A sixth aspect of various preferred embodiments of the present invention relates to the parameter optimization apparatus according to the fifth aspect, wherein the acquisition range used to calculate the initial evaluated value is preferably set by the acquisition range setting means to include an optimum solution to the statistical model created in the past.

That is, the acquisition range setting means can set the acquisition range used for calculating the initial evaluated value to include an optimum solution to the statistical model created in the past.

Since this apparatus implements the parameter optimization method according to various preferred embodiments described above, description of its effects will be omitted to avoid redundancy.

A seventh aspect of various preferred embodiments of the present invention relates to the parameter optimization apparatus according to the fifth or sixth aspect, wherein the statistical model creation means generates the statistical model preferably using a weighted least squares method or robust estimation method.

That is, the statistical model creation means can generate the statistical model using a weighted least squares method or robust estimation method.

Since this apparatus implements the parameter optimization method according to various preferred embodiments described above, description of its effects will be omitted to avoid redundancy.

An eighth aspect of various preferred embodiments of the present invention relates to the parameter optimization apparatus according to any of the fifth to seventh aspects, wherein the statistical model creation means preferably uses a genetic algorithm as a solution to the robust estimation method.

That is, the statistical model creation means can use a genetic algorithm as a solution to the robust estimation method.

Since this apparatus implements the parameter optimization method according to various preferred embodiments described above, description of its effects will be omitted to avoid redundancy.

Also, a ninth aspect of various preferred embodiments of the present invention relates to a computer-executable program for real-time optimization of parameters related to control processing by a control system which controls a controlled object in an environment in which control conditions change dynamically, the computer-executable program causing the control system to perform the following steps including:

a first step of setting an acquisition range of operation information about operation of the controlled object when calculating an initial evaluated value, based on a statistical model created in the past and stored in a storage medium;

a second step of acquiring the operation information in a current environment;

a third step of calculating an evaluated value to evaluate results of the control processing based on the acquired operation information;

a fourth step of creating the statistical model using the calculated evaluated value as an explained variable, and the corresponding operation information as an explanatory variable;

a fifth step of storing the created statistical model in the storage medium;

a sixth step of calculating estimated values of the parameters which will provide an optimum solution to the stored statistical model; and a seventh step of updating the parameters used for the control processing based on the calculated estimated values of the parameters, wherein the parameters are optimized in real time through repetition of the second to seventh steps at time intervals after execution of the first step.

Since this program implements the parameter optimization method according to various preferred embodiments described above, description of its effects will be omitted to avoid redundancy.

Also, a tenth aspect of various preferred embodiments of the present invention relates to a marine vessel navigation control apparatus which controls navigation of a marine vessel, wherein the marine vessel navigation control apparatus, being equipped with the parameter optimization apparatus according to any of the fifth to eighth aspects of various preferred embodiments of the present invention described above, optimizes parameters related to navigation control of the marine vessel during the navigation of the marine vessel and controls the navigation of the marine vessel using the optimized parameters.

Being equipped with the parameter optimization apparatus according to various preferred embodiments described above, the marine vessel navigation control apparatus can, for example, create statistical models for attitude angle control, optimize parameters of the statistical models, controls attitude angles of the marine vessel using the optimized parameter, and control navigation conditions of the marine vessel, based, for example, on various information outputted from a propeller.

An eleventh aspect of various preferred embodiments of the present invention relates to a parameter optimization method for real-time optimization of parameters related to control processing by a control system which controls a controlled object in an environment in which control conditions change dynamically, the method including:
- a first step of setting an acquisition range of operation information about operation of the controlled object when calculating an initial evaluated value, based on a statistical model created in the past and stored in a storage medium;
- a second step of acquiring the operation information in a current environment;
- a third step of calculating an evaluated value to evaluate results of the control processing based on the acquired operation information obtained in the second step;
- a fourth step of creating a statistical model using the calculated evaluated value as an explained variable, and the corresponding operation information as an explanatory variable;
- a fifth step of storing the created statistical model in the storage medium;
- a sixth step of calculating estimated values of parameters which provide an optimum solution to the statistical model stored in the storage medium in the fifth step; and
- a seventh step of updating the parameters used for the control processing based on the calculated estimated values of the parameters; wherein the parameters are optimized in real time through repetition of the second to seventh steps at predetermined time intervals after execution of the first step.

A twelfth aspect of various preferred embodiments of the present invention relates to the parameter optimization method according to the eleventh aspect, wherein the acquisition range used to calculate the initial evaluated value is set to include an optimum solution to the statistical model created in the past.

A thirteenth aspect of various preferred embodiments of the present invention relates to the parameter optimization method according to the eleventh aspect, wherein the statistical model is generated in the fourth step using one of a weighted least squares method and a robust estimation method.

A fourteenth aspect of various preferred embodiments of the present invention relates to the parameter optimization method according to the thirteenth aspect, wherein a genetic algorithm is used as a solution to the robust estimation method.

A fifteenth aspect of various preferred embodiments of the present invention relates to the parameter optimization method according to the eleventh aspect, wherein the controlled object is one of a marine vessel, an aircraft, and an automobile.

A sixteenth aspect of various preferred embodiments of the present invention relates to the parameter optimization method according to the eleventh aspect, wherein the control system is one of a system for navigation speed control or attitude control in a marine vessel, a system for flying speed control or attitude control in an aircraft, and a system for travel speed control or vehicle distance control in an automobile.

A seventeenth aspect of various preferred embodiments of the present invention relates to the parameter optimization method according to the eleventh aspect, wherein the operation information includes at least information about a trim angle of a marine vessel.

An eighteenth aspect of various preferred embodiments of the present invention relates to the parameter optimization method according to the eleventh aspect, wherein the evaluated value that is calculated in the third step is the value of at least one of a trim angle and an engine speed of a marine vessel.

A nineteenth aspect of various preferred embodiments of the present invention relates to the parameter optimization apparatus for real-time optimization of parameters related to control processing by a control system which controls a controlled object in an environment in which control conditions change dynamically, the apparatus including:
- acquisition range setting means for setting an acquisition range of operation information about operation of the controlled object when calculating an initial evaluated value, based on a statistical model created in the past and stored in a statistical model storage means;
- operation information acquisition means for acquiring the operation information in a current environment;
- evaluated-value calculation means for calculating an evaluated value to evaluate results of the control processing based on the operation information acquired by the operation information acquisition means;
- statistical model creation means for creating a statistical model using the evaluated value calculated by the evaluated-value calculation means as an explained variable, and the corresponding operation information as an explanatory variable;
- the statistical model storage means for storing the statistical model created by the statistical model creation means;
- estimated value calculation means for calculating estimated values of the parameters which provide an optimum solution to the statistical model stored in the statistical model storage means; and
- parameter updating means for updating the parameters used for the control processing based on the estimated values of the parameters calculated by the estimated value calculation means.

A twentieth aspect of various preferred embodiments of the present invention relates to the parameter optimization apparatus according to the nineteenth aspect, wherein the acquisition range used to calculate the initial evaluated value is set by the acquisition range setting means to include an optimum solution to the statistical model created in the past.

A twenty-first aspect of various preferred embodiments of the present invention relates to the parameter optimization apparatus according to the nineteenth aspect, wherein the statistical model creation means generates the statistical model using one of a weighted least squares method and a robust estimation method.

A twenty-second aspect of various preferred embodiments of the present invention relates to the parameter optimization apparatus according to the twenty-first aspect, wherein the statistical model creation means uses a genetic algorithm as a solution to the robust estimation method.

A twenty-third aspect of various preferred embodiments of the present invention relates to the parameter optimization apparatus according to the nineteenth aspect, wherein the controlled object is one of a marine vessel, an aircraft, and an automobile.

A twenty-fourth aspect of various preferred embodiments of the present invention relates to the parameter optimization apparatus according to the nineteenth aspect, wherein the control system is one of a system for navigation speed control or attitude control in a marine vessel, a system for flying speed control or attitude control in an aircraft, and a system for travel speed control or vehicle distance control in an automobile.

A twenty-fifth aspect of various preferred embodiments of the present invention relates to the parameter optimization apparatus according to the nineteenth aspect, wherein the operation information includes at least information about a trim angle of a marine vessel.

A twenty-sixth aspect of various preferred embodiments of the present invention relates to the parameter optimization apparatus according to the nineteenth aspect, wherein the evaluated value that is calculated by the evaluated-value calculation means is the value of at least one of a trim angle and an engine speed of a marine vessel.

A twenty-seventh aspect of various preferred embodiments of the present invention relates to a marine vessel navigation control apparatus which controls navigation of a marine vessel, wherein the marine vessel navigation control apparatus includes the parameter optimization apparatus according to the nineteenth aspect and optimizes parameters related to navigation control of the marine vessel during the navigation of the marine vessel and controls the navigation of the marine vessel using the optimized parameters.

A twenty-eighth aspect of various preferred embodiments of the present invention relates to a marine vessel navigational control system including an outboard device and the marine vessel navigational control apparatus according to the twenty-seventh aspect.

A twenty-ninth aspect of various preferred embodiments of the present invention relates to the marine vessel navigational control system according to the twenty-eighth aspect, wherein the outboard device includes an electronic throttle valve defining a thrust regulator and a power trim and tilt unit defining an attitude angle controller.

A thirtieth aspect of various preferred embodiments of the present invention relates to the marine vessel navigational control system according to the twenty-eighth aspect, wherein the marine vessel navigation control apparatus includes a constant-speed navigation controller and a trim angle controller.

A thirty-first aspect of various preferred embodiments of the present invention relates to the marine vessel navigational control system according to the thirtieth aspect, wherein the constant-speed navigation controller includes a target engine speed calculation module which calculates target engine speed based on predetermined input information and an electronic-throttle valve position calculation module which calculates the valve position of an electronic throttle valve according to the calculated target engine speed.

A thirty-second aspect of various preferred embodiments of the present invention relates to the marine vessel navigational control system according to the thirtieth aspect, wherein the trim angle controller includes an evaluated-value calculation module which calculates evaluated values of the trim angle, an information storage medium which stores operation information and evaluated values by associating them with each other, where the operation information includes at least the trim angle, a statistical model creation module which creates a statistical model using the evaluated values stored in the information storage medium as an explained variable, and the operation information including at least the trim angle as an explanatory variable, and a target trim angle calculation module which calculates a target trim angle based on the statistical model stored in the information storage medium.

A thirty-third aspect of various preferred embodiments of the present invention relates to the marine vessel navigational control system according to the twenty-eighth aspect, wherein the marine vessel navigation control apparatus includes a constant-speed navigation controller and a standardization coefficient optimizer for optimizing standardization coefficients used in the statistical model.

A thirty-fourth aspect of various preferred embodiments of the present invention relates to the marine vessel navigational control system according to the thirty-third aspect, wherein the standardization coefficient optimizer includes a standardization coefficient calculation module for determining an optimum standardization coefficient, and the constant-speed navigation controller performs constant-speed navigation control using the newly calculated standardization coefficient.

A thirty-fifth aspect of various preferred embodiments of the present invention relates to a computer-executable program for real-time optimization of parameters related to control processing by a control system which controls a controlled object in an environment in which control conditions change dynamically, the computer-executable program causing the control system to perform the following steps including:

a first step of setting an acquisition range of operation information about operation of the controlled object when calculating an initial evaluated value, based on a statistical model created in the past and stored in a storage medium;

a second step of acquiring the operation information in a current environment;

a third step of calculating an evaluated value to evaluate results of the control processing based on the acquired operation information;

a fourth step of creating a statistical model using the calculated evaluated value as an explained variable, and the corresponding operation information as an explanatory variable;

a fifth step of storing the created statistical model in the storage medium;

a sixth step of calculating estimated values of the parameters which provide an optimum solution to the stored statistical model; and a seventh step of updating the parameters used for the control processing based on the calculated estimated values of the parameters; wherein the parameters are optimized in real time through repetition of the second to seventh steps at predetermined time intervals after execution of the first step.

A thirty-sixth aspect of various preferred embodiments of the present invention relates to a the computer-executable program according to the thirty-fifth aspect, wherein the acquisition range used to calculate the initial evaluated value is set to include an optimum solution to the statistical model created in the past.

A thirty-seventh aspect of various preferred embodiments of the present invention relates to the computer-executable program according to the thirty-fifth aspect, wherein the statistical model is generated in the fourth step using one of a weighted least squares method and a robust estimation method.

A thirty-eighth aspect of various preferred embodiments of the present invention relates to the computer-executable program according to the thirty-seventh aspect, wherein a genetic algorithm is used as a solution to the robust estimation method.

A thirty-ninth aspect of various preferred embodiments of the present invention relates to the computer-executable program according to the thirty-fifth aspect, wherein the controlled object is one of a marine vessel, an aircraft, and an automobile.

A fortieth aspect of various preferred embodiments of the present invention relates to the computer-executable program according to the thirty-fifth aspect, wherein the control system is one of a system for navigation speed control or attitude control in a marine vessel, a system for flying speed control or attitude control in an aircraft, and a system for travel speed control or vehicle distance control in an automobile.

A forty-first aspect of various preferred embodiments of the present invention relates to the computer-executable program according to the thirty-fifth aspect, wherein the operation information includes at least information about a trim angle of a marine vessel.

A forty-second aspect of various preferred embodiments of the present invention relates to the computer-executable program according to the thirty-fifth aspect, wherein the evaluated value that is calculated in the third step is the value of at least one of a trim angle and an engine speed of a marine vessel.

Other features, characteristics, elements, steps and advantages of the present invention will become more apparent from the following detailed description of preferred embodiments of the present invention with reference to the attached drawings.

BRIEF DESCRIPTION OF THE DRAWINGS

FIG. 15A is a diagram showing a membership function used to determine amounts of change in engine speed while FIG. 15B is a diagram showing a fuzzy rule used to determine amounts of change in the valve position of the electronic throttle valve;

DETAILED DESCRIPTION OF THE PREFERRED EMBODIMENTS

Figure 1:
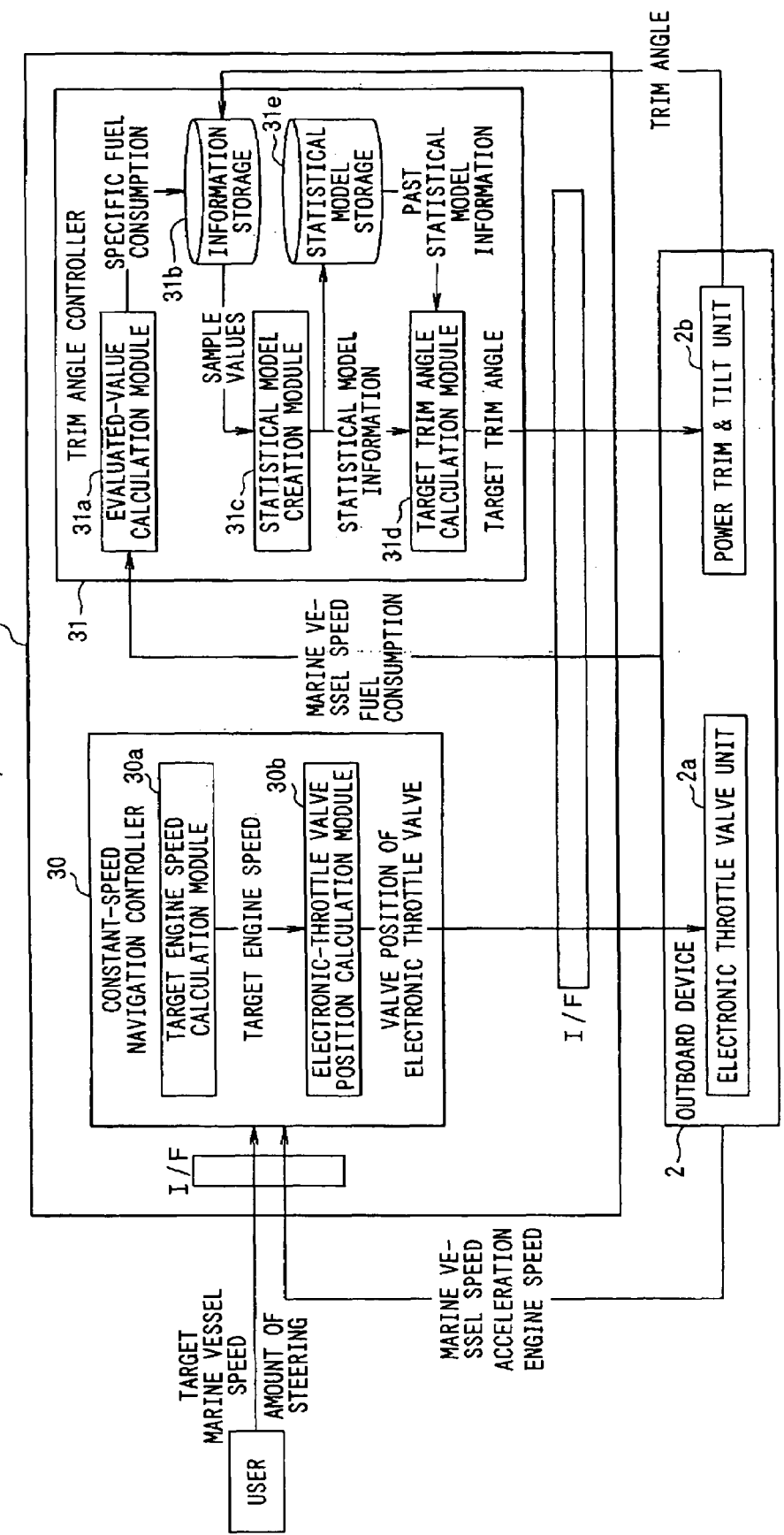
FIG. 1 is a block diagram showing a configuration of a marine vessel navigation control system according to a first preferred embodiment of the present invention.

A preferred embodiment of the present invention will be described with reference to the drawings. FIGS. 1 to 13 are diagrams showing a first preferred embodiment of a marine vessel navigation control system equipped with a parameter optimization apparatus for attitude angle control of small craft according to the present invention. First, the configuration of the marine vessel navigation control system according to various preferred embodiments of the present invention will be described with reference to FIG. 1. FIG. 1 is a block diagram showing a configuration of the marine vessel navigation control system according to a preferred embodiment of the present invention.

It should be noted that, as used herein, the term "module" refers to an algorithm, series of steps or instructions or processes that are performed to achieve certain results or operations, and may take the form of computer software, machine-executable or computer-executable code or instructions, or for operation and/or execution on a processor-based system such as a computer or other system or apparatus, or a signal carrier wave format to be used with an Internet based system. Alternatively, the term "module" can also refer to an actual device or unit provided in a marine vessel that is capable of performing the functions described with respect to each module.

The marine vessel navigation control system 1 preferably includes an outboard device 2 and marine vessel navigation control apparatus 3.

The outboard device 2 preferably includes an electronic throttle valve unit 2a serving as a thrust regulator and a power trim & tilt (hereinafter abbreviated to PTT) unit 2b serving as an attitude angle regulator.

The marine vessel navigation control apparatus 3 preferably includes a constant-speed navigation controller 30 and trim angle controller 31.

The constant-speed navigation controller 30 preferably includes a target engine speed calculation module 30a which calculates target engine speed based on predetermined input information and an electronic-throttle valve position calculation module 30b which calculates the valve position of an electronic throttle valve according to the calculated target engine speed.

The target engine speed calculation module 30a includes a fuzzy logic system which is fed with marine vessel speed deviation (difference between current marine vessel speed and target marine vessel speed) and acceleration, estimates an amount of change in target engine speed, and outputs current target engine speed by adding the target engine speed obtained by the previous calculation to the estimation result.

The electronic-throttle valve position calculation module 30b includes a fuzzy logic system as is the case with the target engine speed calculation module 30a. The electronic-throttle valve position calculation module 30b is fed with engine speed deviation (difference between current engine speed and target engine speed) and the amount of change in the engine speed, estimates the amount of change in the valve position of the electronic throttle valve, and outputs a current valve position of the electronic throttle valve by adding the valve position of the electronic throttle valve obtained by the previous calculation to the estimation result. Fuzzy tables in the fuzzy logic system are designed based on seamanship of skilled navigators, a simplified reasoning method is used, and fuzzy rules in the reasoning method are represented by real numbers.

The trim angle controller 31 preferably includes an evaluated-value calculation module 31a which calculates evaluated values of the trim angle; an information storage medium 31b which stores operation information and evaluated values by associating them with each other, where the operation information includes at least the trim angle; a statistical model creation module 31c which creates a statistical model using the evaluated values stored in the information storage medium 31b as an explained variable, and the operation information including at least the trim angle as an explanatory variable; and a target trim angle calculation module 31d which calculates a target trim angle based on the statistical model.

The evaluated-value calculation module 31a calculates specific fuel consumption from fuel consumption and travel distance and outputs the calculated specific fuel consumption as an evaluated value of the trim angle, where the fuel consumption is preferably measured by a fuel flowmeter inserted in a fuel passage extending from a fuel tank to a fuel injector of the outboard device 2 while the travel distance is calculated from marine vessel speed measured by a speedometer.

The information storage medium 31b stores the trim angle and the specific fuel consumption at the given trim angle as a pair.

The statistical model creation module 31c estimates partial regression coefficients of a given regression equation by the LTS estimation method using the specific fuel consumption stored in the information storage medium 31b as an explained variable, and the trim angle as an explanatory variable. Then, it creates a statistical model based on the estimation result.

The target trim angle calculation module 31d calculates target attitude angles based on the statistical model created by the statistical model creation module 31c.

A statistical model storage medium 31e stores parameters of the created statistical model.

A specific operation of the marine vessel navigation control system 1 will be described with reference to FIGS. 2A to 5.

Figure 2A:
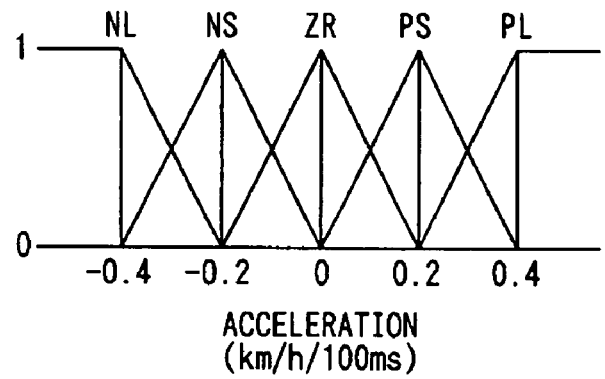
FIGS. 2A and 2B are explanatory diagrams of a fuzzy rule used by a target engine speed calculation module to calculate target engine speed.
Figure 2B:
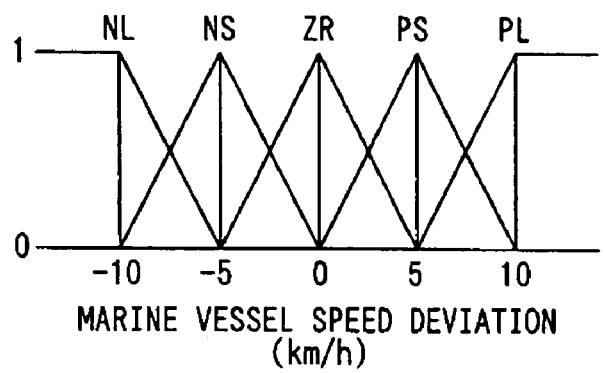
Figure 3A:
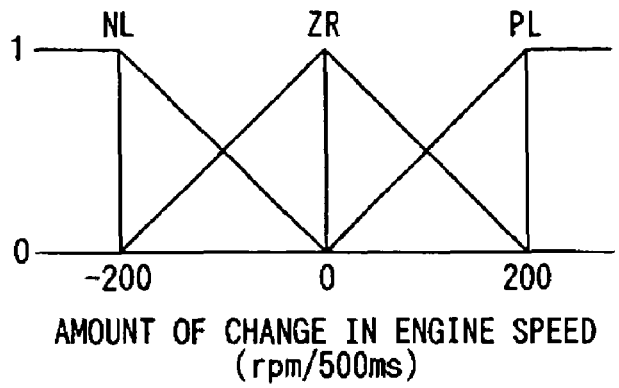
FIGS. 3A and 3B are explanatory diagrams of a fuzzy rule used by an electronic-throttle valve position calculation module to calculate a valve position of an electronic throttle valve.
Figure 3B:
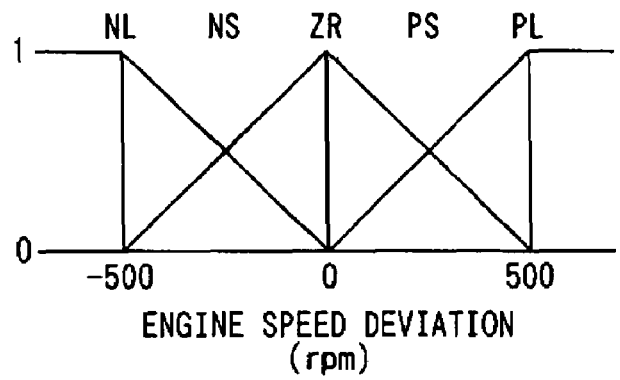
Figure 4A:
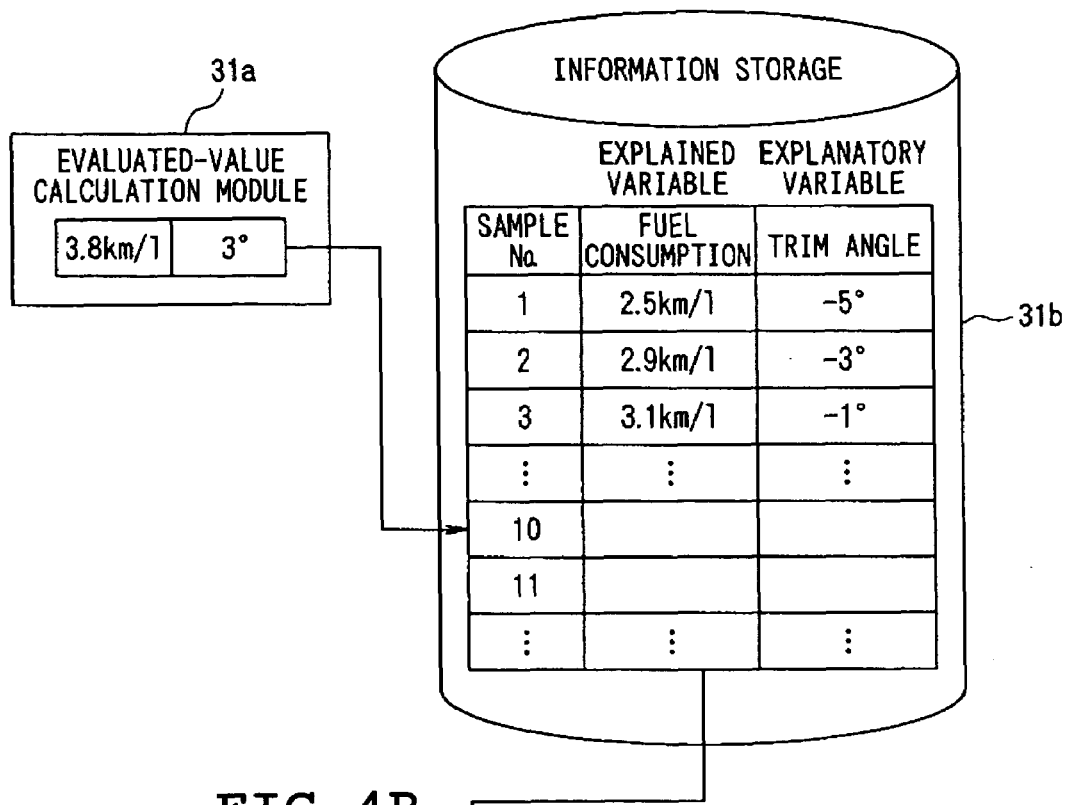
FIGS. 4A and 4B are diagrams showing data flow among an evaluated-value calculation module, an information storage medium, and a statistical model creation module.
Figure 4B:
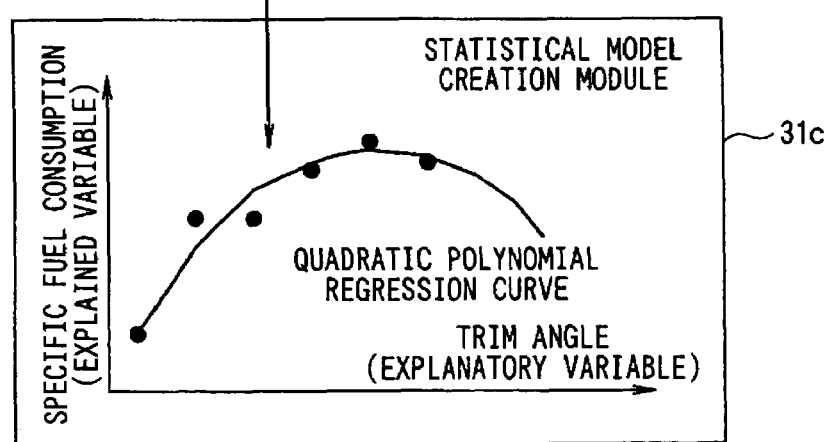
Figure 5A:
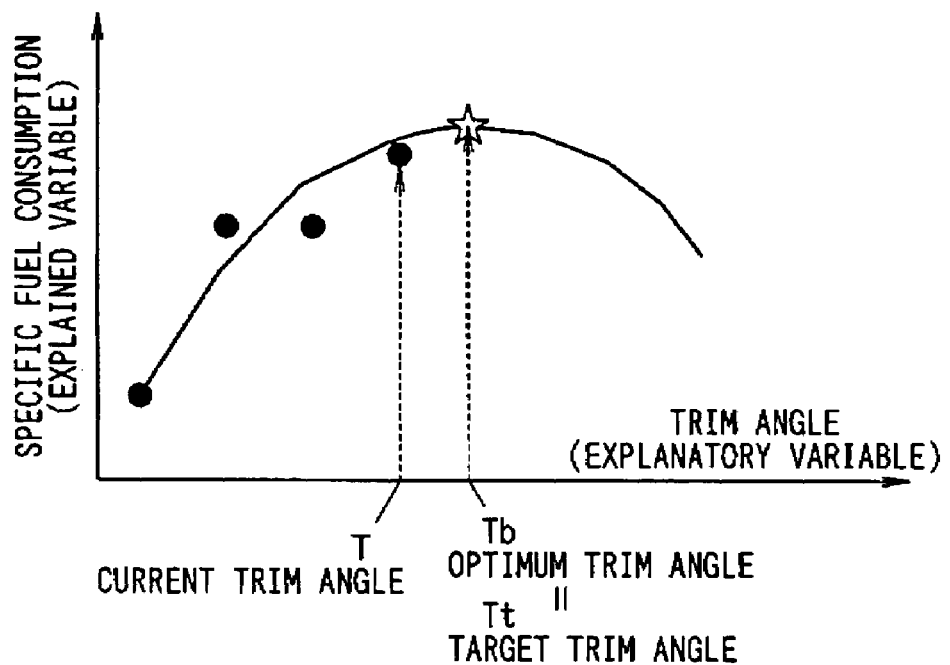
FIGS. 5A and 5B are diagrams showing a relationship between specific fuel consumption and a trim angle.
Figure 5B:
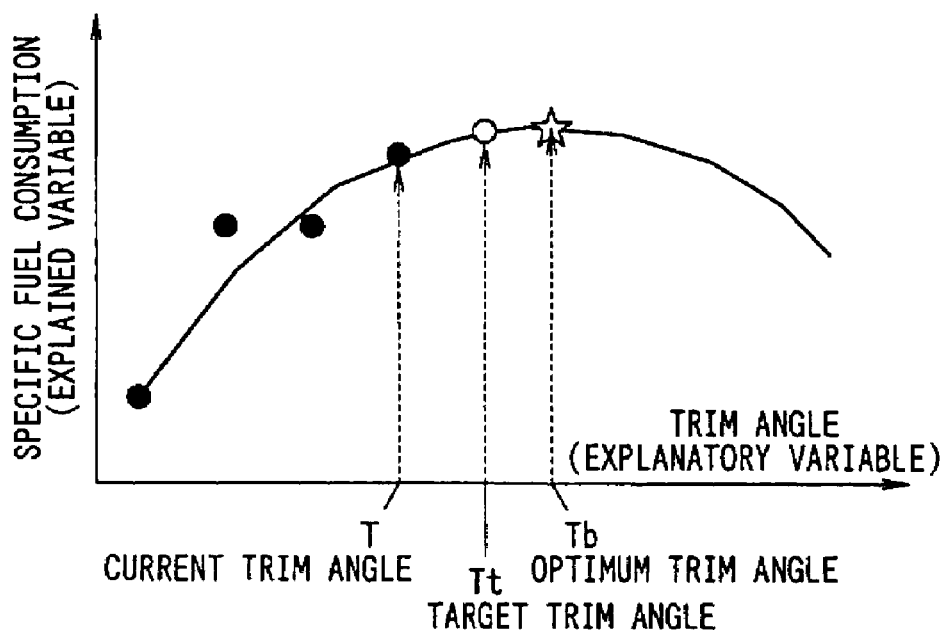
Figure 6:
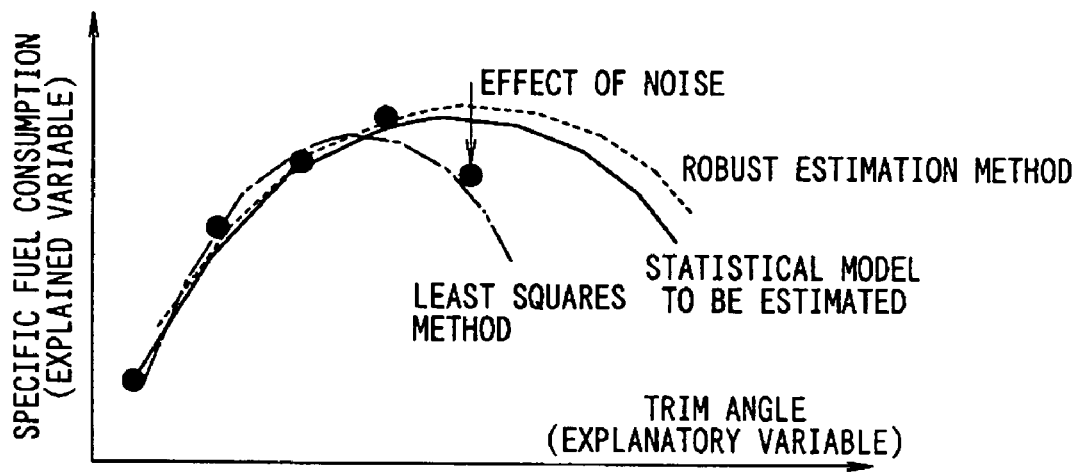
FIG. 6 is a diagram showing an example of how a quadratic polynomial is estimated by a robust estimation method.

FIGS. 2A and 2B are explanatory diagrams of a fuzzy rule used by the target engine speed calculation module 30a to calculate target engine speed, FIGS. 3A and 3B are explanatory diagrams of a fuzzy rule used by the electronic-throttle valve position calculation module 30b to calculate the valve position of the electronic throttle valve, FIGS. 4A and 4B are diagrams showing data flow among the evaluated-value calculation module 31a, the information storage medium 31b, and the statistical model creation module 31c, and FIGS. 5A and 5B are diagrams showing the relationship between specific fuel consumption and trim angle.

The first preferred embodiment of the present invention will be described citing a case in which the system 1 is applied to a marine vessel equipped with an outboard device which in turn is equipped with an electronic-throttle valve unit and the trim angle of the outboard device (hereinafter referred to as the trim angle) is controlled when the marine vessel is traveling at a constant speed set by the user.

First, the user sets a target marine vessel speed. As the target marine vessel speed, the user may enter any desired value or select from among multiple values prepared at the factory. Once the target marine vessel speed is set, an initial value of the target engine speed is set based on the target marine vessel speed. For example, if the current navigation speed of the marine vessel is around the target marine vessel speed, the current engine speed is set as the target engine speed, but if the current navigation speed of the marine vessel is not around the target marine vessel speed, a predetermined initial value of the target engine speed is preferably used. As the initial value of the target engine speed, the user may enter any desired value or select from among multiple values prepared at the factory.

Once the initial value of the target engine speed is set, the target engine speed corresponding to the navigation speed at the time is calculated under the actual navigation conditions of the marine vessel based on the fuzzy rule shown in FIGS. 2A and 2B. Specifically, inferred values of marine vessel speed deviation and acceleration are obtained using a membership function shown in FIG. 2A, and then the fuzzy rule shown in FIG. 2B is applied to them to determine a weighted average and calculate the amount of change in the target engine speed. In the membership function, the marine vessel speed deviation (difference between target marine vessel speed and actual marine vessel speed) is determined from detected values of actual marine vessel speed, and the acceleration is calculated from the marine vessel speed. As shown in FIG. 2A, the membership function provides four values each of the marine vessel speed deviation and acceleration: large and small positive values (PL and PS) and large and small negative values (NL and NS). These values are weighted and averaged based on the fuzzy rule shown in FIG. 2B. Thus, the amount of change in the target engine speed is determined. Then, by adding the amount of change to the current target engine speed, a new target engine speed is determined.

Then, the target engine speed calculation module 30a outputs the target engine speed to the electronic-throttle valve position calculation module 30b, which then calculates throttle valve position based on the received target engine speed. As is the case with the target engine speed calculation module 30a, the electronic-throttle valve position calculation module 30b calculates the throttle valve position using the fuzzy logic system. Specifically, upon acquiring the target engine speed from the target engine speed calculation module 30a, the electronic-throttle valve position calculation module 30b infers values of engine speed deviation from detected values of the engine speed using a membership function shown in FIG. 3A and calculates the amount of change in the engine speed from the detected values of the engine speed. Thus, as is the case with FIGS. 2A and 2B above, the amount of change in the throttle valve position is determined by weighting and averaging the values of the membership function based on the fuzzy rule shown in FIG. 3B. Then, by adding the amount of change to the valve position of the electronic throttle valve, the new valve position of the electronic throttle valve is determined.

When the electronic throttle valve position is newly calculated in this way, the constant-speed navigation controller 30 controls the electronic throttle valve unit 2a so as to comply with the newly calculated electronic throttle valve position.

In this preferred embodiment, it is assumed that the trim angle is controlled within a range of about −5° to about 8°, for example.

The trim angle is normally adjusted by the user with a trim switch, and if trim angle control is selected when the marine vessel is traveling at constant speed, the trim angle control is started.

Once the trim angle control is started, the trim angle controller 31 controls the PTT unit 2b so that the initial trim angle will be about "−5°", for example. At the same time, the evaluated-value calculation module 31a calculates the specific fuel consumption over a certain period, specifically, for example, by dividing the distance traveled in, for example, 20 seconds, which is calculated from the average marine vessel speed over the 20 second period, by the fuel consumption measured by a fuel flowmeter (not shown) for the 20 second period. Then, the evaluated values (pairs of a trim angle and specific fuel consumption, which are hereinafter referred to as sample values) obtained are stored one after another in the information storage medium 31b as shown in FIGS. 4A and 4B.

According to this preferred embodiment, the trim angle is set subsequently to approximately "−3°," "−1°," and "1°" in increments of "2°", for example, and sample values of the specific fuel consumption are acquired as initial sample values at the four trim angles.

After the initial sample values are acquired as shown in FIG. 4A, the statistical model creation module 31c estimates partial regression coefficients β0, β1, and β2 of a predetermined quadratic polynomial given by Equation (5) below by the least trimmed squares (LTS) estimation method (a robust estimation method) using the fuel consumption in the sample values as an explained variable y, and the trim angle as an explanatory variable t, as shown in FIG. 4B.

$$y = \beta 0 + \beta 1 \times t + \beta 2 \times t^2 \quad (5)$$

The LTS estimation method used in this preferred embodiment utilizes Equation (6) below as an LTS criterion. In Equation (6), i represents the order of i-th residual in n residuals $r^2 = (y_i - yhat_i)^2$ counted in ascending order and h equals 0.8n (rounded up to an integer).

Formula 4

$$LTS = 1/h \sum_{i=1}^{h} (y_i - yhat_i)^2 \quad (6)$$

Besides, this preferred embodiment uses a real-coded genetic algorithm (hereinafter referred to as the real-coded GA) as a solution to the LTS estimation method. The real-coded GA searches for an individual that minimizes a fitness function using the partial regression coefficients β0, β1, and β2 as genes of individuals, and an LTS criterion as the fitness function. Parameters of the real-coded GA are shown below.

Population size: 50
Selection method: Best individual+one individual selected randomly
Generation alternation model: MGG (Minimal Generation Gap) model
Family population size: 20
Crossover technique: Unimodal normal distribution crossover (UNDX)

Then, the target trim angle calculation module 31d determines t which maximizes y in a range of approximately "−5≦t≦8" using the quadratic polynomial and outputs it as the target trim angle Tt.

When the new target trim angle Tt is calculated, the trim angle controller 31 controls the PTT unit 2b so as to comply with the newly calculated target trim angle.

Furthermore, the evaluated-value calculation module 31a calculates the specific fuel consumption again from the target trim angle Tt. Then, the statistical model creation module 31c acquires the new sample value and creates a new statistical model by repeating the above-described procedures again. In this way, the quadratic polynomial given by Equation (5) above is updated sequentially, and optimization is completed when the target trim angle calculated by the target trim angle calculation module 31d stops changing.

Generally, the methodology for creating statistical models from sample values and performing optimization on the statistical models is known as response surface methodology, of which the Monte Carlo method or experimental design is used to obtain sample values efficiently. Specifically, random sampling is performed so as to cover an area in which sample values are obtained or sampling is performed using a method (Latin square design or orthogonal design) based on experimental design. However, this preferred embodiment is intended to optimize the trim angle, which is a parameter used to adjust hull resistance, and changing it abruptly will cause abrupt changes to the load on the outboard device and to steering characteristics, which may cause anxiety and discomfort to occur in the user.

To avoid this situation, according to this preferred embodiment, initial sample values are acquired at around the full trim-in position, which provides the most stable value. Specifically, for example, the initial target trim angle is preferably set to about −5°, for example, at the beginning of optimization and the acquisition range of sample values is preferably set to acquire sample values subsequently at trim angles of approximately −3°, −1°, and 1° in increments of 2°, for example. When sample values are acquired at the four trim angles, the statistical model creation module 31c sets up a polynomial regression equation. This makes it possible to calculate optimum values without increasing the trim angle unduly.

Besides, limits are set on the amount of change in the trim angle. Specifically, for example, the limit on the amount of a single change in the trim angle is preferably set at about ±2°. Then, if the difference between the current trim angle and target trim angle calculated from statistical models does not exceed the change limit as shown in FIG. 5A, the target trim angle is output as it is, but if the change limit is exceeded as shown in FIG. 5B, the value of the limit is output as a new target trim angle. This eliminates the chance of causing abrupt changes to the trim angle and thereby causing anxiety and discomfort in the user.

In addition to using the above-described technique, this preferred embodiment preferably collects sample values around optimum values probabilistically and adjusts the acquisition range of initial sample values using past statistical models, to obtain sample values efficiently.

Figure 7:
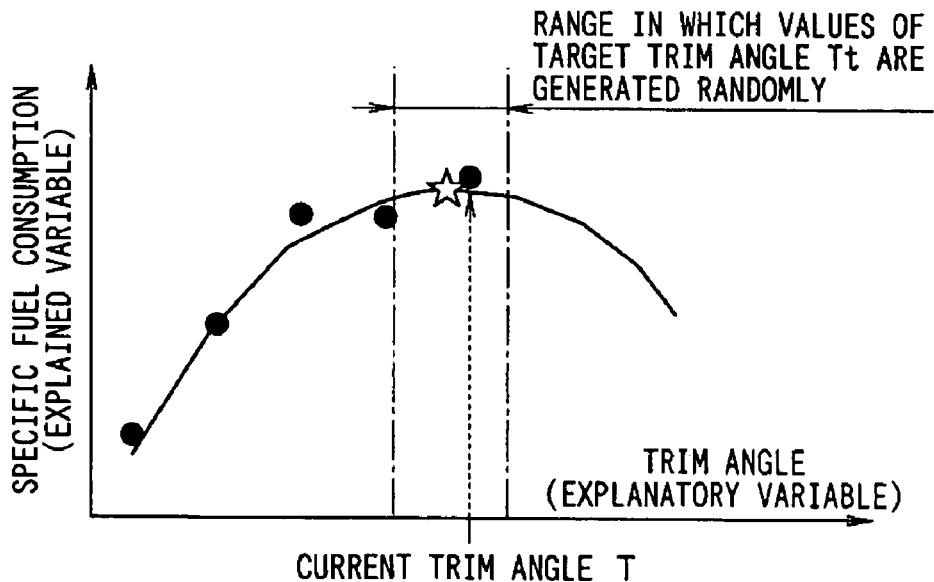
FIG. 7 is a diagram showing a relationship between specific fuel consumption and trim angle in the case where values of a target trim angle Tt are generated randomly.

First, probabilistic collection of sample values around an optimum trim angle will be described with reference to FIG. 7. FIG. 7 is a diagram showing a relationship between specific fuel consumption and trim angle in the case where values of the target trim angle Tt are generated randomly.

If the current trim angle T coincides with the optimum trim angle Tb as shown in FIG. 7, the value obtained by adding a probabilistic perturbation of about ±1° to the current trim angle T is output as the target trim angle Tt. This makes it possible to collect sample values efficiently around the optimum trim angle, thereby improving the accuracy of the statistical model.

Figure 8:
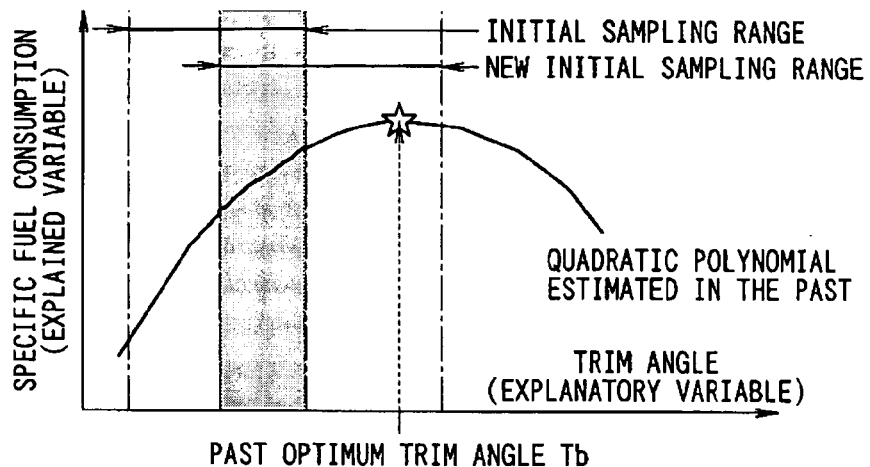
FIG. 8 is a diagram showing an example of how an initial sampling range is adjusted based on a past statistical model.

Next, with reference to FIG. 8, description will be given of how an acquisition range of initial sample values is adjusted using a past statistical model. FIG. 8 is a diagram showing a relationship between specific fuel consumption and trim angle in the case where a past statistical model is used.

As shown in FIG. 8 and as described above, a predetermined initial sampling range is used for the first optimization. The partial regression coefficients of the statistical model obtained in the first optimization are stored in the statistical model storage medium 31e. In the second and subsequent optimizations, initial sampling ranges are set so as to slightly exceed the trim angles which provide the optimum solutions to the statistical models stored in the statistical model storage medium 31e and trim angles are incremented at regular intervals so that the required number of samples can be obtained.

It is also possible, for example, to calculate average values from the partial regression coefficients of a plurality of statistical models obtained in the past, set the initial sampling range so as to slightly exceed the trim angle which provides the optimum solution to the statistical model whose partial regression coefficients are given by the average values calculated above, and increment trim angles at regular intervals so that the required number of samples can be obtained. This makes it possible to set the initial sampling range stably even if great noise is added to sample values and individual statistical models vary.

By repeating the above-described operations, it is possible to select the optimum trim angle using a small number of sample values even in an environment prone to disturbances.

Figure 9:
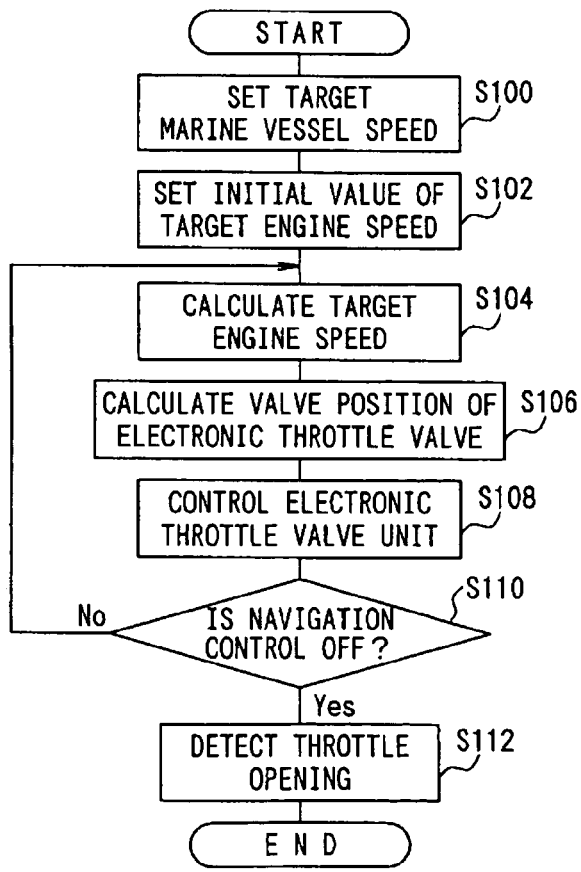
FIG. 9 is a flowchart showing operation processes of a constant-speed navigation controller.

Now, a flow of operation processes of the constant-speed navigation controller 30 will be described with reference to FIG. 9. FIG. 9 is a flowchart showing operation processes of the constant-speed navigation controller 30.

As shown in FIG. 9, first, the constant-speed navigation controller 30 sets the target marine vessel speed in Step S100, and then the process advances to Step S102.

Regarding the target marine vessel speed, the user may enter any desired value or select from among multiple values prepared at the factory, as described above.

In Step S102, the constant-speed navigation controller 30 sets the initial value of the target engine speed, and then the process advances to Step S104.

Regarding the initial value of the target engine speed, the user may enter any desired value or select from among multiple values prepared at the factory, as described above.

In Step S104, the constant-speed navigation controller 30 makes the target engine speed calculation module 30a calculate the target engine speed using the fuzzy logic system as described above and inputs the calculation result to the electronic-throttle valve position calculation module 30b. Then, the process advances to Step S106.

In Step S106, the constant-speed navigation controller 30 makes the electronic-throttle valve position calculation module 30b calculate the valve position of the electronic throttle valve based on the inputted target engine speed using the fuzzy logic system as described above. Then, the process advances to Step S108.

In Step S108, the constant-speed navigation controller 30 controls the electronic throttle valve unit 2a of the outboard device 2 based on the calculated electronic throttle valve position. Then, the process advances to Step S110.

In Step S110, the constant-speed navigation controller 30 judges whether navigation control is OFF. If it is determined that the navigation control is OFF (Yes), the constant-speed navigation controller 30 advances to Step S112. Otherwise (No), the process advances to Step S104.

In Step S112, the constant-speed navigation controller 30 detects the throttle opening, and then finishes processing.

Figure 10:
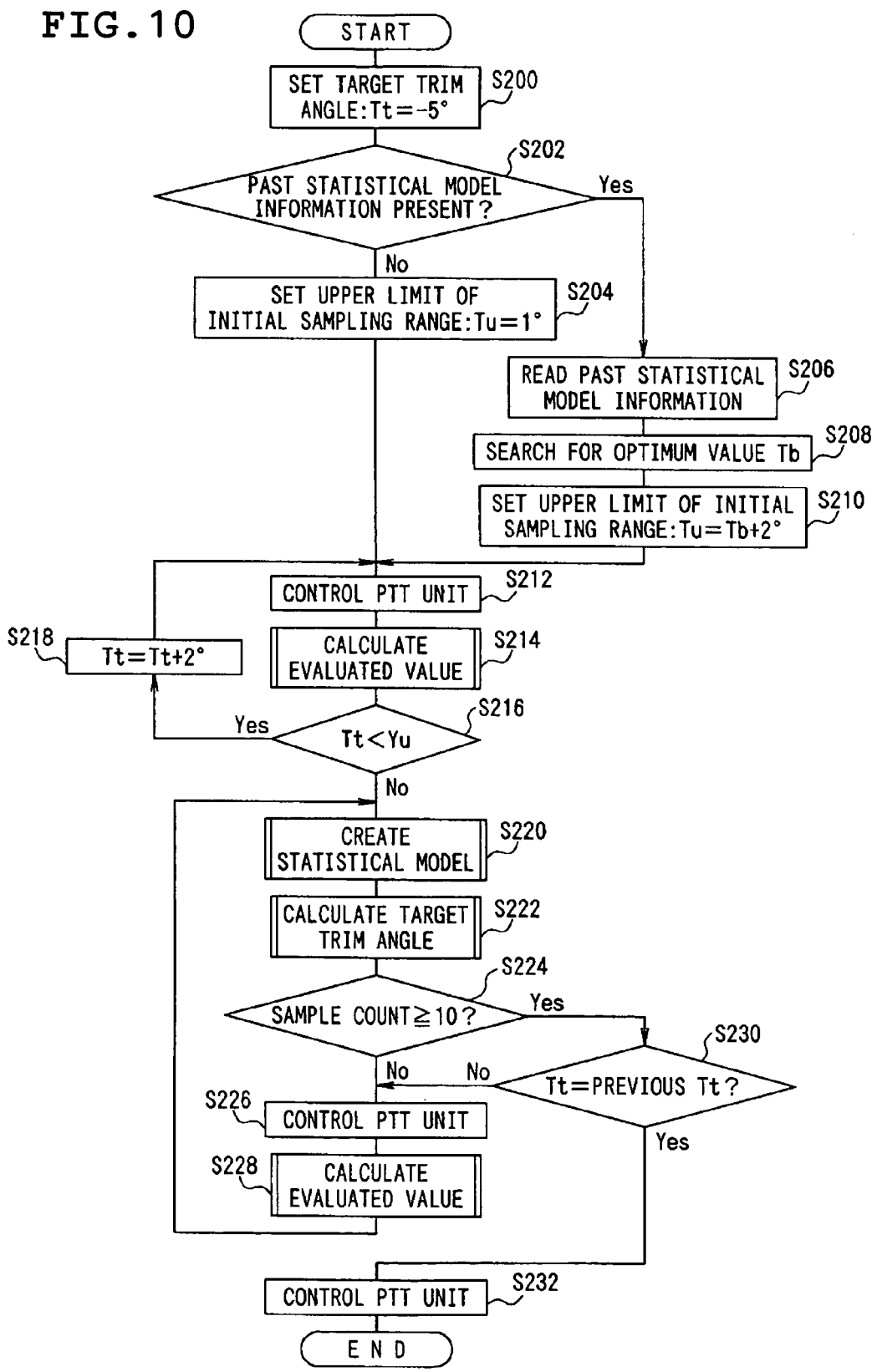
FIG. 10 is a flowchart showing operation processes of the trim angle controller.

Now, a flow of operation processes of the trim angle controller 31 will be described with reference to FIG. 10. FIG. 10 is a flowchart showing operation processes of the trim angle controller 31.

As shown in FIG. 10, first the trim angle controller 31 sets the initial target trim angle Tt to −5° in Step S200, and then the process advances to Step S202.

In Step S202, the trim angle controller 31 judges whether past statistical model information is present in the statistical model storage medium 31e. If the past statistical model information is not present (No), the trim angle controller 31 advances to Step S204. If the past statistical model information is present (Yes), the process advances to Step S206.

In Step S204, the trim angle controller 31 sets the upper limit of the initial sampling range Tu to approximately 1°, for example, and then the process advances to Step S212.

In Step S206, the trim angle controller 31 reads the partial regression coefficients $\beta 0$, $\beta 1$, and $\beta 2$ as the past statistical model information from the statistical model storage medium 31e, and then the process advances to Step S208.

In Step S208, the trim angle controller 31 searches for the optimum value Tb of the quadratic polynomial which has the partial regression coefficients $\beta 0$, $\beta 1$, and $\beta 2$, and then the process advances to Step S210.

In Step S210, the trim angle controller 31 sets Tu=Tb+2°. Then, the process advances to Step S212.

In Step S212, the trim angle controller 31 controls the PTT unit 2b so that the current trim angle T will match the target trim angle Tt. Then, the process advances to Step S214.

In Step S214, the trim angle controller 31 makes the evaluated-value calculation module 31a calculate the specific fuel consumption based on the distance traveled in 20 seconds and the fuel consumption for the same period and stores the calculation result in the information storage medium 31b. Then, the process advances to Step S216.

In Step S216, the trim angle controller 31 judges whether the trim angle T has reached Tu. If the trim angle T has not reached Tu (No), the trim angle controller 31 advances to Step S218. If the trim angle T has reached Tu (Yes), the trim angle controller 31 advances to Step S220.

In Step S218, the trim angle controller 31 increments Tt by about 2°, for example. Then, the process advances to Step S212.

In Step S220, the trim angle controller 31 makes the statistical model creation module 31c create a statistical model using the sample values stored in the information storage medium 31b. Then, the process advances to Step S222.

In Step S222, the trim angle controller 31 makes the target trim angle calculation module 31d optimize the created statistical model and calculate the trim angle which provides the optimum evaluated value, as the target trim angle Tt. Then, the process advances to Step S224.

In Step S224, the trim angle controller 31 judges whether 10 or more sample values have already been obtained. If 10 sample values have not been obtained yet (No), the process advances to Step S226. If 10 or more sample values have been obtained (Yes), the process advances to Step S230.

In Step S226, the trim angle controller 31 controls the PTT unit 2b so that the current trim angle T will match the target trim angle Tt. Then, the process advances to Step S228.

In Step S228, the trim angle controller 31 makes the evaluated-value calculation module 31a calculate the specific fuel consumption based on the distance traveled in 20 seconds and the fuel consumption for the same period and stores the calculation result in the information storage medium 31b. Then, the process advances to Step S220.

In Step S230, the trim angle controller 31 judges whether the current target trim angle Tt matches the previous target trim angle Tt. If they do not match (No), the trim angle controller 31 advances to Step S226. If they match (Yes), the process advances to Step S232.

In Step S232, the trim angle controller 31 controls the PTT unit 2b so that the current trim angle T will match the target trim angle Tt, and then finishes processing.

Figure 11:
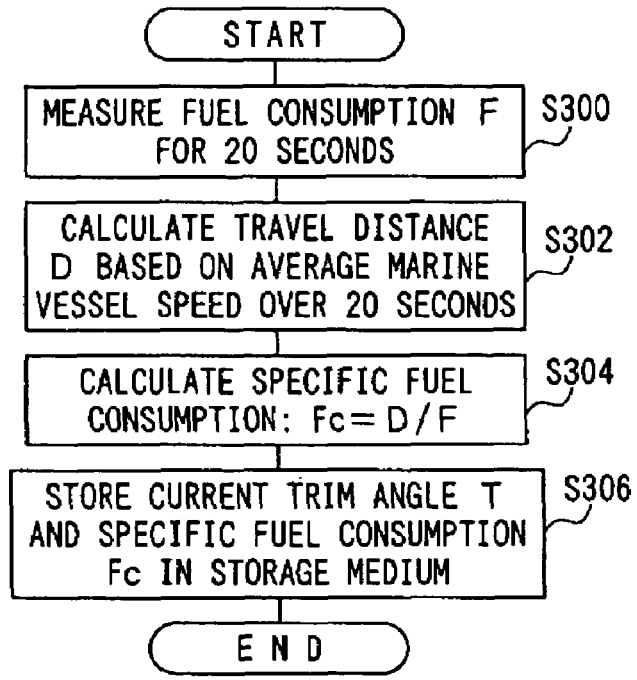
FIG. 11 is a flowchart showing operation processes of the evaluated-value calculation module.

Now, a flow of operation processes of the evaluated-value calculation module 31a will be described with reference to FIG. 11. FIG. 11 is a flowchart showing operation processes of the evaluated-value calculation module 31a.

As shown in FIG. 11, first in Step S300, the evaluated-value calculation module 31a acquires the fuel consumption F measured by the fuel flowmeter for 20 seconds, and then the process advances to Step S302.

In Step S302, the evaluated-value calculation module 31a calculates the distance D traveled in the 20 seconds using the average marine vessel speed over the 20 second period based on the marine vessel speed acquired from the outboard device 2. Then, the evaluated-value calculation module 31a advances to Step S304.

According to this preferred embodiment, the processes in Steps S300 and S302 are preferably performed concurrently.

In Step S304, the evaluated-value calculation module 31a calculates the specific fuel consumption Fc based on the fuel consumption F and travel distance D using Equation (7) below. Then, the process advances to Step S306.

$$Fc = D/F \quad (7)$$

In Step S306, the evaluated-value calculation module 31a stores the current trim angle T and specific fuel consumption Fc in the information storage medium 31b, and then finishes processing.

Figure 12:
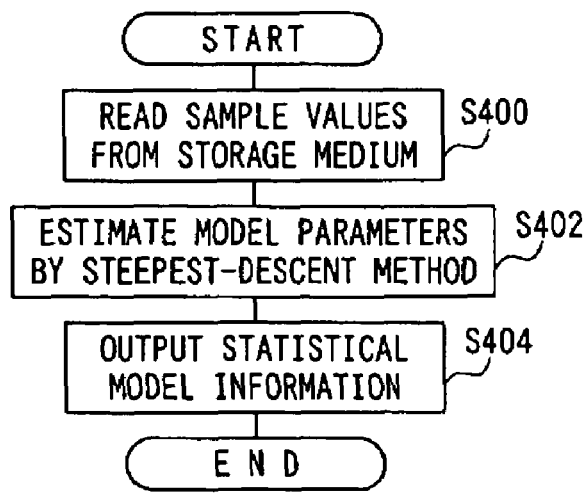
FIG. 12 is a flowchart showing operation processes of a statistical model creation module.

Now, a flow of operation processes of the statistical model creation module 31c will be described with reference to FIG. 12. FIG. 12 is a flowchart showing operation processes of the statistical model creation module 31c.

As shown in FIG. 12, first the statistical model creation module 31c reads sample values from the information storage medium 31b in Step S400, and then the process advances to Step S402.

In Step S402, the statistical model creation module 31c estimates the partial regression coefficients $\beta 0$, $\beta 1$, and $\beta 2$ of the quadratic polynomial (Equation (5) above) by the steepest-descent method based on a least squares criterion. Then, the process advances to Step S404.

In Step S404, the statistical model creation module 31c outputs resulting statistical model information, i.e., the partial regression coefficients $\beta 0$, $\beta 1$, and $\beta 2$, to the target trim angle calculation module 31d, and then finishes processing.

Figure 13:
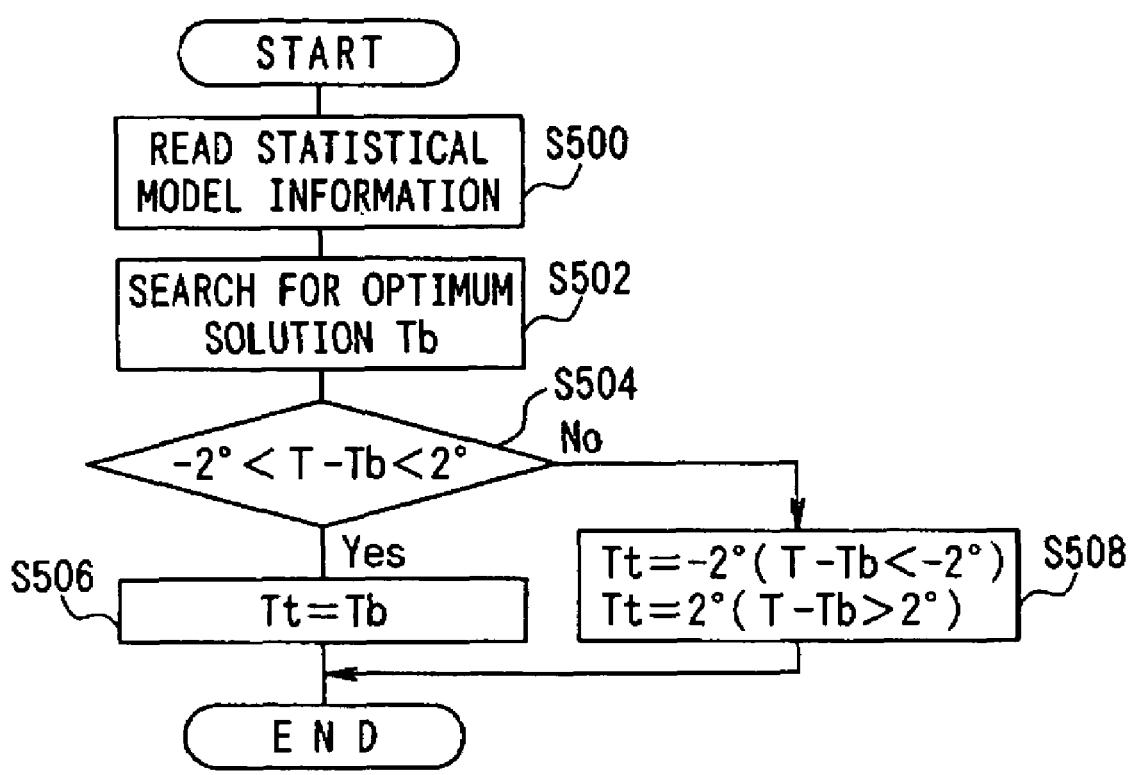
FIG. 13 is a flowchart showing operation processes of a target trim angle calculation module.

Now, a flow of operation processes of the target trim angle calculation module 31d will be described with reference to FIG. 13. FIG. 13 is a flowchart showing operation processes of the target trim angle calculation module 31d.

As shown in FIG. 13, first the target trim angle calculation module 31d acquires the partial regression coefficients $\beta 0$, $\beta 1$, and $\beta 2$ from the statistical model creation module 31c in Step S500, and then the process advances to Step S502.

In Step S502, the target trim angle calculation module 31d searches for an optimum solution Tb to the quadratic polynomial which has the partial regression coefficients $\beta 0$, $\beta 1$, and $\beta 2$. Then, the target trim angle calculation module 31d advances to Step S504.

In Step S504, the target trim angle calculation module 31d calculates the difference between Tb determined as described above and the current trim angle T and judges whether "−2°<T−Tb<2°" is true or false. If it is true (Yes), the target trim angle calculation module 31d advances to Step S506, and if it is false (No), the target trim angle calculation module 31d advances to Step S508.

In Step S506, the target trim angle calculation module 31d outputs the obtained Tb as the target trim angle Tt, and then finishes processing.

In Step S508, the target trim angle calculation module 31d outputs "Tt=T+2°" if "T−Tb>2°," or "Tt=T−2°" if "T−Tb<−2°," as the target trim angle Tt, and then finishes processing.

Thus, during navigation of a small craft, the evaluated-value calculation module 31a can acquire the trim angle and the specific fuel consumption and calculate evaluated values from the acquired data, the statistical model creation module 31c can create a statistical model based on the calculated evaluated value and the trim angle, and the target trim angle calculation module 31d can calculate the optimum trim angle of the outboard device 2 with respect to the hull using the created statistical model.

Figure 14:
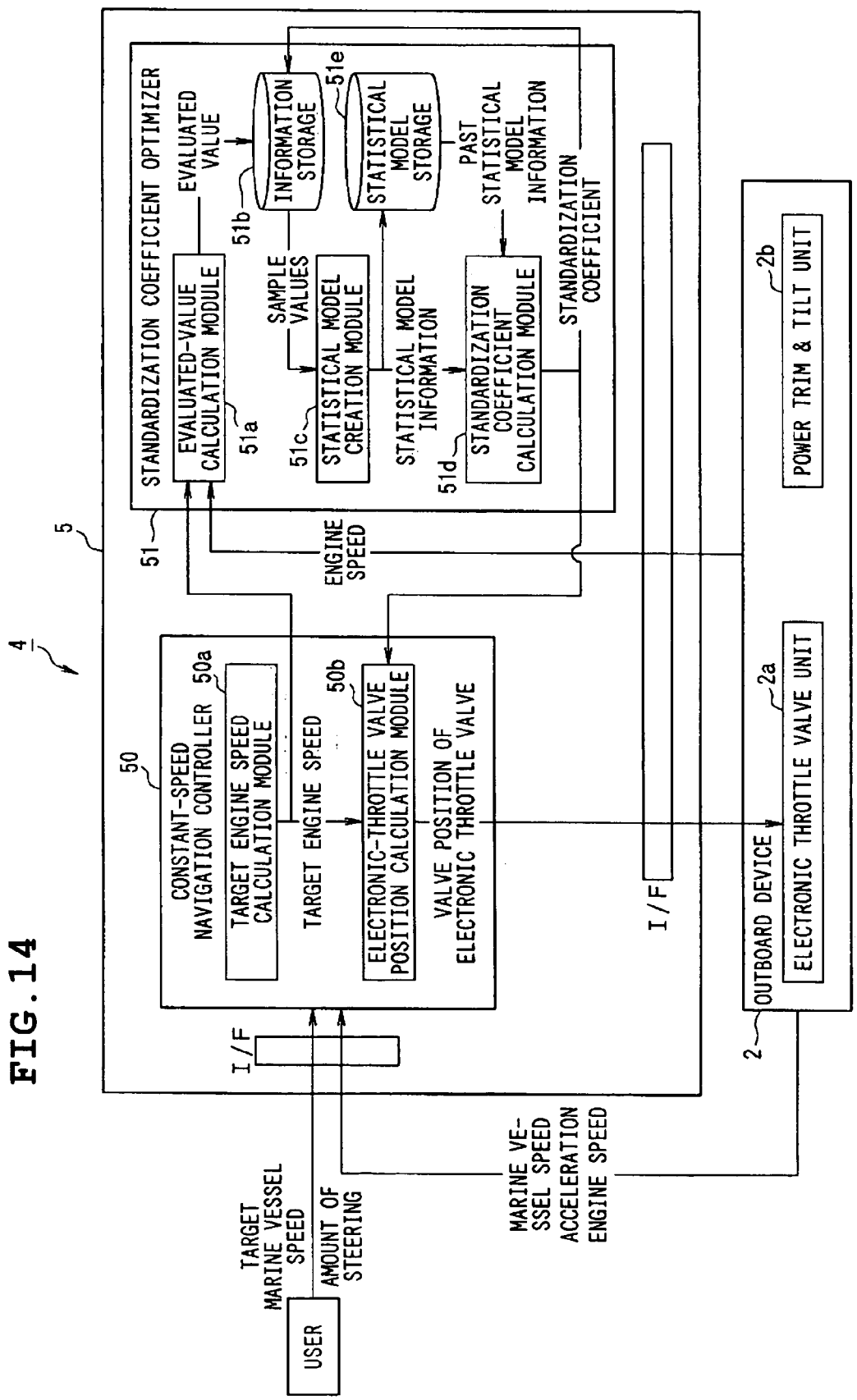
FIG. 14 is a block diagram showing a configuration of a marine vessel navigation control system according to a second preferred embodiment of the present invention.

Now, with reference to FIGS. 14 to 22, a second preferred embodiment of the present invention will be described citing a case in which the system 1 is applied to a marine vessel equipped with an outboard device which in turn is equipped with an electronic-throttle valve unit and engine speed control characteristics are optimized when the marine vessel is traveling at a constant speed set by the user. FIG. 14 is a block diagram showing a configuration of the marine vessel navigation control system according to the second preferred embodiment of the present invention. FIG. 15A is a diagram showing a membership function used to determine amounts of change in engine speed while FIG. 15B is a diagram showing a fuzzy rule used to determine amounts of change in the valve position of the electronic throttle valve.

Constant-speed navigation control is basically the same as the one described above in the first preferred embodiment except for the following differences, and thus, the overall description thereof will be omitted.

A marine vessel navigation control apparatus 5 preferably includes a constant-speed navigation controller 50 and a standardization coefficient optimizer 51.

The constant-speed navigation controller 50 preferably includes a target engine speed calculation module 50a and electronic-throttle valve position calculation module 50b.

Upon acquiring a target engine speed from the target engine speed calculation module 50a, the electronic-throttle valve position calculation module 50b infers values of engine speed deviation from detected values of the engine speed using a new membership function obtained by multiplying the basic membership function shown in FIG. 15A by standardization coefficients s1 and s2 and calculates the amount of change in the engine speed from the detected values of the engine speed.

Also, it determines the amount of change in the valve position of the electronic throttle valve using the values of the membership function which are weighted based on a new fuzzy rule obtained by multiplying the basic fuzzy rule shown in FIG. 15B by a standardization coefficient s3. Then, the amount of change is added to the valve position of the electronic throttle valve to determine the new valve position of the electronic throttle valve.

According to this preferred embodiment, the standardization coefficients are adjusted within a range of about 0.5 to about 2.0, for example.

When constant-speed navigation control is started, standardization coefficients are started to be optimized.

When the optimization of the standardization coefficients is started, the standardization coefficient optimizer 51 sets a reference standardization coefficient vector Ss to Ss={1 1 1}. On the other hand, an evaluated-value calculation module 51a calculates an evaluated value of engine speed control for a predetermined period. Specifically, it uses, for example, Equation (8) below.

$$\text{(Evaluated value)}=\text{(Average engine speed deviation over 1 min.)}+\text{(Average engine speed variation over 1 min.)} \quad (8)$$

Figure 22:
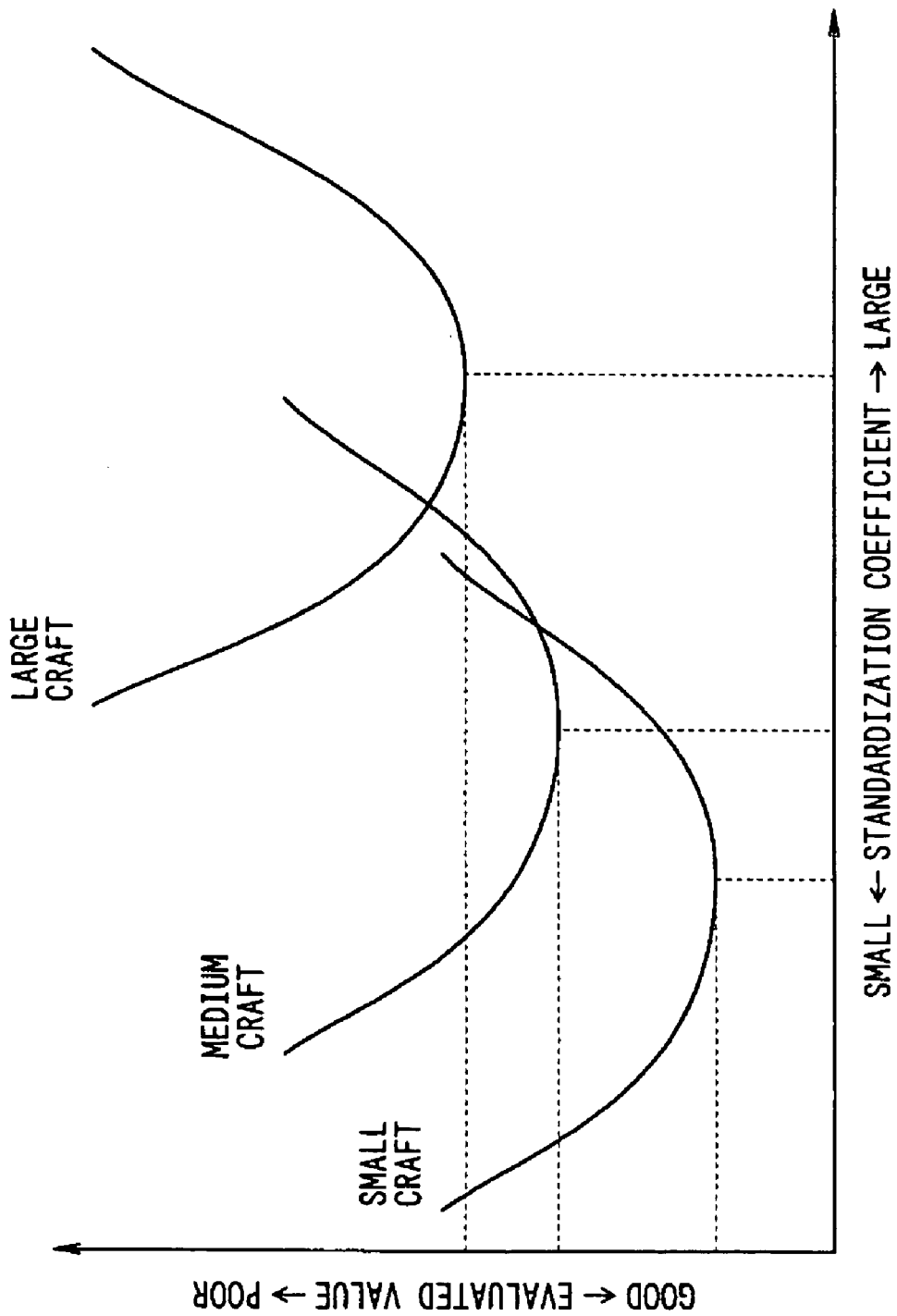
FIG. 22 is a diagram showing a landscape of an evaluation function by changing the standardization coefficients of a consequent membership function for each hull size.

Optimum standardization coefficients for engine speed control characteristics vary with the controlled object. Specifically, a change of hull involves a resistance change, which causes an evaluation function for engine speed control to change its landscape, resulting in changes in the locations of the optimum standardization coefficients. FIG. 22 depicts the landscape of the evaluation function by changing the standardization coefficients of a consequent membership function for each size of a hull (two standardization coefficients of an antecedent membership function can be changed similarly, but this is omitted for the sake of simplicity). As can be seen from the figure, in the case of a small craft, decreasing the standardization coefficients to suppress fluctuations rather than degradation of trackability improves fitness while in the case of a large craft, increasing the standardization coefficients to suppress degradation of trackability rather than fluctuations improves fitness because of increased hull resistance.

The examples described above concern marine vessels of similar shapes, but passenger boats intended for rapid movement and Japanese-style marine vessels with emphasis on stability, for example, differ greatly in the resistance they encounter even when they have the same overall length. A similar problem arises when marine vessels differ in the type of hull as with this example. There are a great many hull makers in the world. Besides, hulls are used differently depending on the region and application. Thus, it is difficult to set optimum standardization coefficients assuming a controlled object in advance and it is necessary to perform optimization in real time during actual navigation.

Pairs of a standardization coefficient vector and an evaluated value of engine speed control (hereinafter referred to as sample values) obtained are stored one after another in an information storage medium 51b shown in FIG. 14, similar to the information storage medium 31b shown in FIGS. 4A and 4B.

According to this preferred embodiment, 11 standardization coefficient vectors determined randomly within ±0.2 of each element of the vector Ss and their evaluated values are acquired as initial sample values.

Once the initial sample values are obtained, a statistical model creation module 51c estimates partial regression coefficients $\beta 0$ to $\beta 9$ of a three-variable quadratic polynomial given by Equation (9) below by the least trimmed squares (LTS) estimation method (a robust estimation method) using the evaluated values of engine speed control in the sample values as an explained variable y, and the standardization coefficients as an explanatory variable vector S (S={s1 s2 s3}).

$$y=\beta 0 +\beta 1\times s1+\beta 2\times s2+\beta 3\times s3+\beta 2\times s1\times s2+\beta 2\times s1\times s3+\beta 2\times s2\times s3+\beta 7\times s1^2+\beta 8\times s2^2+\beta 9\times s3^2 \quad (9)$$

The LTS estimation method and a solution using it are the same as those described above in the first preferred embodiment, and thus, description thereof will be omitted.

Parameters of the real-coded GA are shown below.

Population size: 50

Selection method: Best individual+one individual selected randomly

Generation alternation model: MGG (Minimal Generation Gap) model

Family population size: 50

Crossover technique: Unimodal normal distribution crossover (UNDX)

Then, the standardization coefficient calculation module 51d determines and outputs an optimum standardization coefficient Sb which maximizes y in a range of "$0.5 \leq t \leq 2$" using the quadratic polynomial.

When the new standardization coefficient is calculated, the constant-speed navigation controller 50 performs constant-speed navigation control using the newly calculated standardization coefficient.

Then, again, the evaluated-value calculation module 51a calculates the evaluated values of engine speed control using the standardization coefficient S and the statistical model creation module 51c acquires new sample values and creates a new statistical model by repeating the above-described procedures. In this way, the polynomial given by Equation (9) above is updated sequentially, and optimization is completed when the number of sample values exceeds 20 and the standardization coefficient calculated by the standardization coefficient calculation module 51d stops changing.

As is the case with the first preferred embodiment, this second preferred embodiment is intended to optimize standardization coefficients, which are parameters used to adjust input/output for electronic-throttle valve control, and changing them abruptly will cause abrupt changes to steering characteristics, which may cause anxiety and discomfort to occur in the user.

To avoid this situation, according to this preferred embodiment, the initial sample values are acquired around most average standardization coefficients (this is because too large of standardization coefficients will cause hunting, resulting in an uncomfortable ride while too small of standardization coefficients will degrade trackability). Specifically, for example, the reference standardization coefficient vector at the time of beginning optimization is preferably set to {1 1 1} and the acquisition range is preferably set such that sample values can be acquired randomly within about ±0.2, for example, of each element. Then, when 11 sample values are acquired, the partial regression coefficients of the three-variable quadratic polynomial are estimated. This makes it possible to calculate optimum values without increasing the standardization coefficients unduly.

Figure 16A:
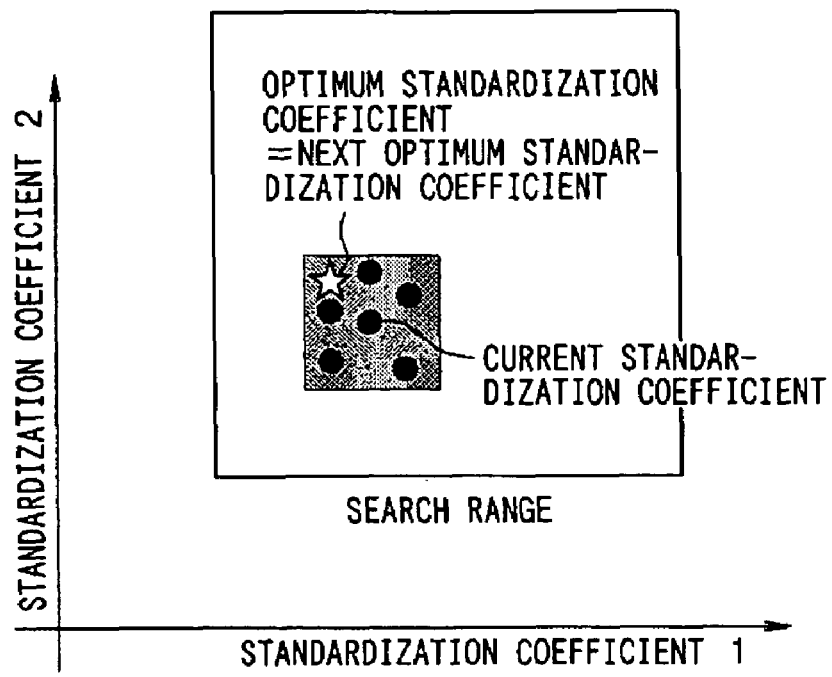
FIGS. 16A and 16B are diagrams showing a relationship between a first standardization coefficient and a second standardization coefficient in the case where a limit is placed on amounts of change in the standardization coefficients.
Figure 16B:
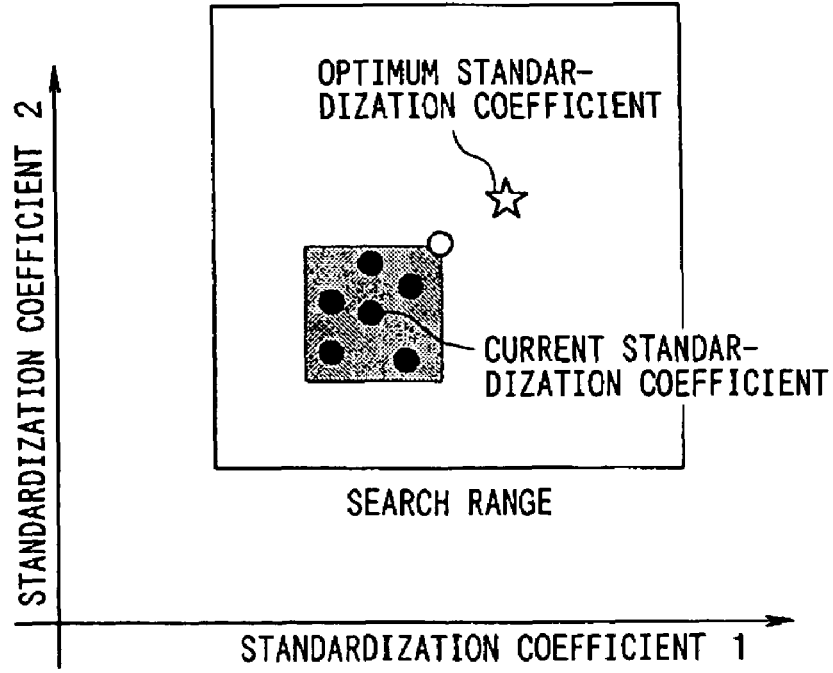

Also, a limit is placed on the amounts of change in the standardization coefficients. A specific example will be described with reference to FIGS. 16A and 16B. FIGS. 16A and 16B are diagrams showing relationship between a standardization coefficient 1 and standardization coefficient 2 in the case where a limit is placed on the amounts of change in the standardization coefficients.

As shown in FIG. 16A, assuming that the amount of one change in the standardization coefficient is limited to within about ±0.2 of each element, when the difference between the current standardization coefficient and target standardization coefficient calculated from the response surface does not exceed the limit on the amount of change, the target standardization coefficient is output as they are. On the other hand, if the limit is exceeded as shown in FIG. 16B, the limit is output as a new standardization coefficient. This eliminates the chance of causing abrupt changes to the standardization coefficient and thereby causing anxiety and discomfort in the user.

In addition to using the above-described technique, this preferred embodiment also collects sample values around optimum values probabilistically and adjusts the acquisition range of initial sample values using past statistical models, to obtain sample values efficiently.

Figure 17:
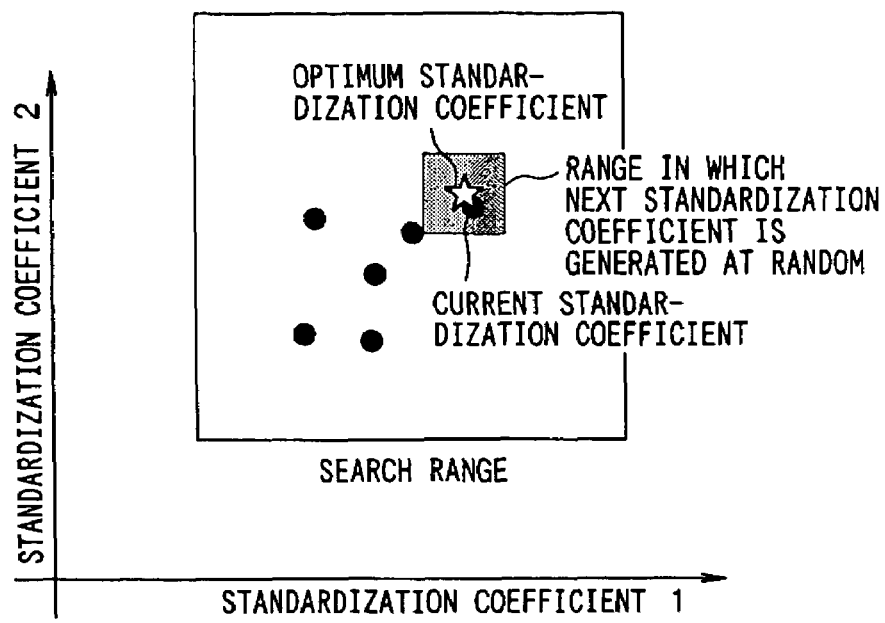
FIG. 17 is a diagram showing an example of a relationship between the first standardization coefficient and a standardization coefficient in the case where an acquisition range of initial sample values is adjusted.

With reference to FIG. 17, a description will be given of an example of how the acquisition range of initial sample values is adjusted. FIG. 17 is a diagram showing an example of a relationship between the standardization coefficient 1 and standardization coefficient 2 in the case where the acquisition range of initial sample values is adjusted.

First, a description will be given of how sample values are collected probabilistically around an optimum standardization coefficient. If the current standardization coefficient S matches the optimum standardization coefficient Sb as shown in FIG. 17, the values obtained by adding a probabilistic perturbation of ±1° to each element of S are output as a new current standardization coefficient S. This makes it possible to collect sample values efficiently around the optimum standardization coefficient, improving the accuracy of the statistical model.

Figure 18:
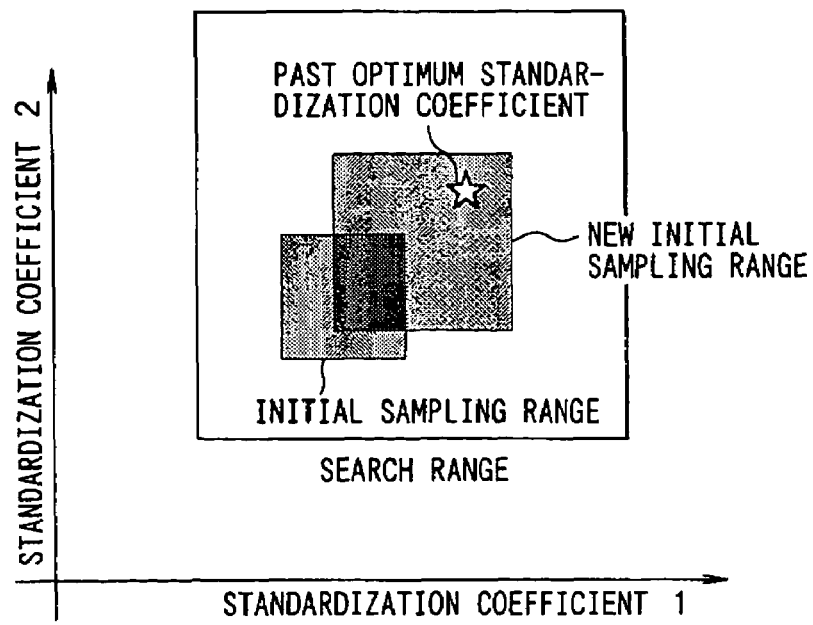
FIG. 18 is a diagram showing an example of how an initial sampling range is adjusted based on a past statistical model.

The adjustment of the acquisition range of initial sample values using past statistical models is the same as that described above in the first preferred embodiment, and thus, description thereof will be omitted (see FIG. 18).

By repeating the above-described operations, it is possible to select the optimum standardization coefficient using a small number of sample values even in an environment prone to disturbances.

Figure 19:
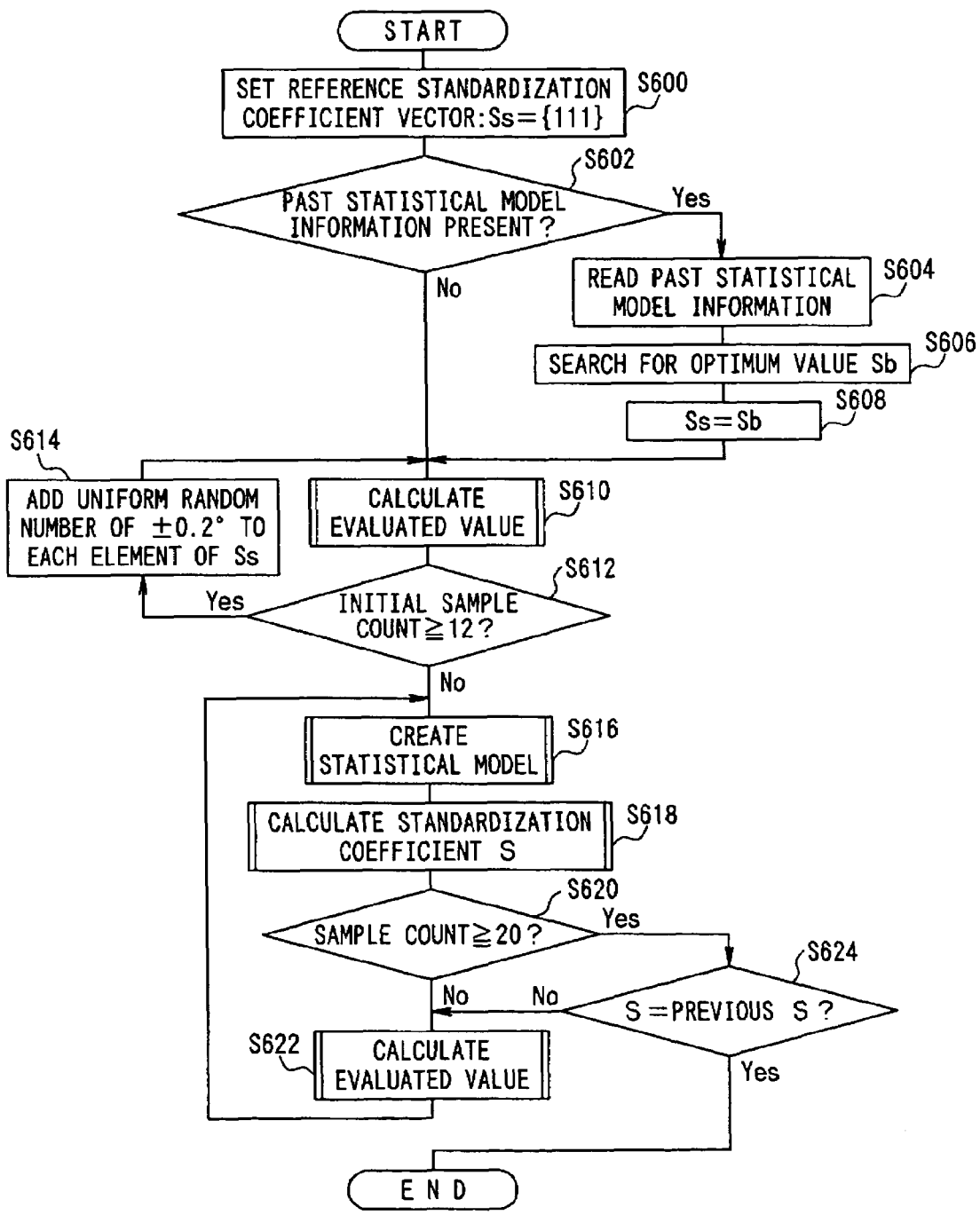
FIG. 19 is a flowchart showing operation processes of a standardization coefficient optimizer.

Now, a flow of operation processes of the standardization coefficient optimizer 51 will be described with reference to FIG. 19. FIG. 19 is a flowchart showing operation processes of the standardization coefficient optimizer 51.

As shown in FIG. 19, first, the standardization coefficient optimizer 51 sets the reference standardization coefficient vector Ss to Ss={1 1 1} in Step S600, and then the process advances to Step S602.

In Step S602, the standardization coefficient optimizer 51 judges whether past statistical model information is present in a statistical model storage medium 51e. If the past statistical model information is present (Yes), the standardization coefficient optimizer 51 advances to Step S604. If the past statistical model information is not present (No), the process advances to Step S610.

In Step S604, the standardization coefficient optimizer 51 reads the partial regression coefficients $\beta i (i=0, 1, 2, \ldots, 9)$ as the past statistical model information from the statistical model storage medium 51e, and then the process advances to Step S606.

In Step S606, the standardization coefficient optimizer 51 searches for the optimum value Sb of the three-variable quadratic polynomial which has the read partial regression coefficients. Then, the process advances to Step S608.

In Step S608, the standardization coefficient optimizer 51 sets Ss=Sb. Then, the process advances to Step S610.

In Step S610, the standardization coefficient optimizer 51 calculates an evaluated value based on the average engine speed deviation and average engine speed variation over 1 minute and stores it in the information storage medium 51b. Then, the process advances to Step S612.

In Step S612, the standardization coefficient optimizer 51 judges whether the number of initial sample values has reached 12. If the number has not reached 12 (No), the standardization coefficient optimizer 51 goes to Step S614. If the number has reached 12 (Yes), the standardization coefficient optimizer 51 advances to Step S616.

In Step S614, the standardization coefficient optimizer 51 outputs the values obtained by adding a uniform random number of ±0.2° to each element of Ss as a new standardization coefficient S. Then, the process advances to Step S610.

In Step S616, the standardization coefficient optimizer 51 makes the statistical model creation module 51c create a statistical model using the sample values stored in the information storage medium 51b. Then, the process advances to Step S618.

In Step S618, the standardization coefficient optimizer 51 makes the standardization coefficient calculation module 51d optimize the created statistical model and newly calculates a standardization coefficient which provides an optimum evaluated value. Then, the process advances to Step S620.

In Step S620, the standardization coefficient optimizer 51 judges whether 20 or more sample values have already been obtained. If 20 sample values have not been obtained yet (No), the process advances to Step S622. If 20 or more sample values have been obtained (Yes), the process advances to Step S624.

In Step S622, the standardization coefficient optimizer 51 calculates an evaluated value based on the average engine speed deviation and average engine speed variation over 1 minute and stores it in the information storage medium 51b. Then, the process advances to Step S616.

In Step S624, the standardization coefficient optimizer 51 judges whether the current standardization coefficient S matches the previous standardization coefficient S. If they do not match (No), the standardization coefficient optimizer 51 the process advances to Step S622. If they match (Yes), the standardization coefficient optimizer 51 finishes processing.

Figure 20:
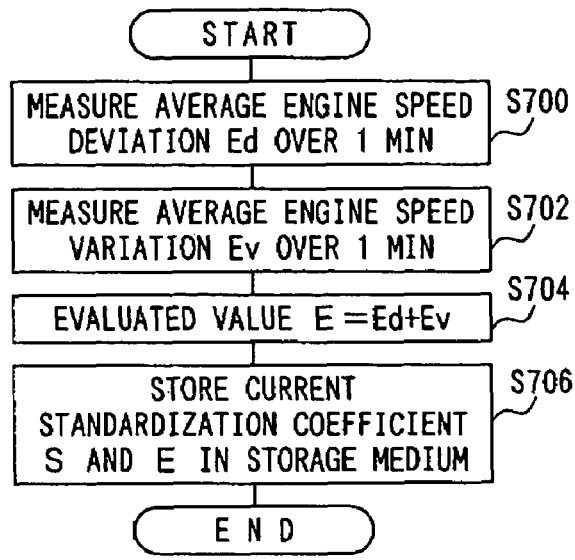
FIG. 20 is a flowchart showing operation processes of an evaluated-value calculation module.

Now, a flow of operation processes of the evaluated-value calculation module 51*a* will be described with reference to FIG. 20. FIG. 20 is a flowchart showing operation processes of the evaluated-value calculation module 51*a*.

Figure 21:
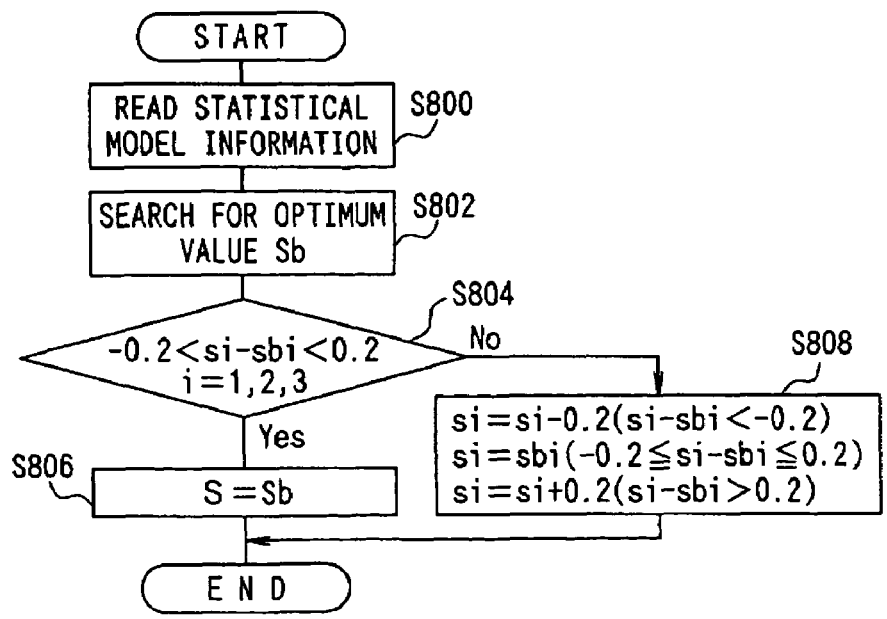
FIG. 21 is a flowchart showing operation processes of a standardization coefficient calculation module.

As shown in FIG. 21, first, the evaluated-value calculation module 51*a* measures the average engine speed deviation Ed over 1 minute in Step S700, and then the process advances to Step S702.

In Step S702, the evaluated-value calculation module 51*a* measures the average engine speed variation Ev over 1 minute. Then, the process advances to Step S704.

According to this preferred embodiment, the processes in Steps S700 and S702 are preferably performed concurrently.

In Step S704, the evaluated-value calculation module 51*a* calculates an evaluated value E based on the calculated Ed and Ev using Equation (10) below. Then, the process advances to Step S706.

$$E=Ed+Ev \qquad (10)$$

In Step S706, the evaluated-value calculation module 51*a* stores the current standardization coefficient vector S and evaluated value E in the information storage medium 51*b*, and then finishes processing.

Now, a flow of operation processes of the standardization coefficient calculation module 51*d* will be described with reference to FIG. 21. FIG. 21 is a flowchart showing operation processes of the standardization coefficient calculation module 51*d*.

As shown in FIG. 21, first, the standardization coefficient calculation module 51*d* reads the partial regression coefficients $\beta i (i=0, 1, 2, \ldots, 9)$ in Step S800 from the statistical model creation module 51*c*, and then the process advances to Step S802.

In Step S802, the standardization coefficient calculation module 51*d* searches for the optimum value Sb of the three-variable quadratic polynomial. Then, the process advances to Step S804.

In Step S804, the standardization coefficient calculation module 51*d* calculates the difference between the obtained optimum value Sb and the current standardization coefficient S and judges about each element $si(i=1, 2, 3)$ whether $-0.2<si-sbi<0.2$ is true or false. If it is true (Yes), the standardization coefficient calculation module 51*d* advances to Step S806, and if it is false (No), the standardization coefficient calculation module 51*d* advances to Step S808.

In Step S806, the standardization coefficient calculation module 51*d* outputs the optimum value Sb as the standardization coefficient S, and then finishes processing.

In Step S808, the standardization coefficient calculation module 51*d* outputs, if $si-sbi<-0.2$, as new si the value obtained by subtracting 0.2 from the present si, outputs si=sbi if $-0.2 \leq si-sbi \leq 0.2$, or outputs, if $si-sbi>0.2$, as new si the value obtained by adding 0.2 to the present si, and then the standardization coefficient calculation module 51*d* finishes processing.

Thus, during navigation of a small craft, it is possible to estimate partial regression coefficients $\beta 0$ to $\beta 9$ of the three-variable quadratic polynomial given by Equation (9) above by the least trimmed squares (LTS) estimation method (a robust estimation method) using the evaluated values of engine speed control as an explained variable y, and the standardization coefficients as an explanatory variable vector S (S={s1 s2 s3}), thereby create a statistical model, and perform constant-speed navigation control using the created statistical model.

Referring to FIG. 1, the process of setting the acquisition range performed by the evaluated-value calculation module 31*a* to acquire initial sample values at around the full trim-in position, which provides the most stable value, corresponds to the acquisition range setting means, the process of acquiring fuel consumption and marine vessel speed performed by the evaluated-value calculation module 31*a* corresponds to the operation information acquisition means, the process of calculating evaluated values performed by the evaluated-value calculation module 31*a* corresponds to the evaluated-value calculation means, the statistical model creation module 31*c* corresponds to the statistical model creation means, the target trim angle calculation module 31*d* corresponds to the estimated value calculation means, and the statistical model storage medium 31*e* corresponds to the statistical model storage means. Referring to FIG. 14, the process, performed by the evaluated-value calculation module 51*a*, of setting the reference standardization coefficient vector to {1 1 1} and setting the acquisition range such that sample values can be acquired randomly within about ±0.2 of each element corresponds to the acquisition range setting means, the process of acquiring standardization coefficient vectors and the evaluated values of engine speed control performed by the evaluated-value calculation module 51*a* corresponds to the operation information acquisition means, the process of calculating evaluated values performed by the evaluated-value calculation module 51*a* corresponds to the evaluated-value calculation means, the statistical model creation module 51*c* corresponds to the statistical model creation means, the standardization coefficient calculation module 51*d* corresponds to the estimated value calculation means, and the statistical model storage medium 51*e* corresponds to the statistical model storage means.

Incidentally, although according to the above-described preferred embodiments, a predetermined quadratic polynomial is preferably used as the structure of statistical models, the statistical model creation module 31*c* or 51*c* may determine the structure of statistical models. For example, indices which represent the fit of a statistical model to sample values include information criteria typified by AIC (Akaike Information Criterion). Let F denote the degree of freedom of the model subjected to maximum likelihood estimation and the AIC is given by Equation (11) below.

$$AIC=-2 \text{ (maximum log likelihood)}+2F \qquad (11)$$

The smaller the AIC value, the better fit the statistical model is judged to provide to sample values. Thus, by creating two or more statistical models (e.g., a linear expression, quadratic polynomial, and cubic polynomial) and selecting the statistical model with the smallest AIC value for the given sample value, it is possible to always create the optimum statistical model.

Besides the AIC, other criteria for selecting a statistical model are available, including BIC (Bayesian Information Criteria), MDL (Minimum Description Length), Cross Validation, and FPE (Final Prediction Error).

As described above, the parameter optimization apparatus according to various preferred embodiments of the present invention sets an acquisition range of operation information about operation of a controlled object based on a past statistical model to create a statistical model, measures the operation information during the operation of the controlled object, creates the statistical model based on the measured data, and calculates optimum parameters related to the control of the controlled object. This makes it possible to calculate the optimum parameters in a short period of time without being affected by disturbances during the operation of the controlled object.

The parameter optimization method according to other preferred embodiments of the present invention is implemented by the parameter optimization apparatus, and thus, description of its effects is omitted to avoid redundancy.

Also, the parameter optimization program according to another preferred embodiment of the present invention is used to control the parameter optimization apparatus, and thus, description of its effects is omitted to avoid redundancy.

Also, the marine vessel navigation control apparatus according to yet another preferred embodiment of the present invention is equipped with the parameter optimization apparatus, and thus, description of its effects is omitted to avoid redundancy.

It should be understood that the foregoing description is only illustrative of the present invention. Various alternatives and modifications can be devised by those skilled in the art without departing from the present invention. Accordingly, the present invention is intended to embrace all such alternatives, modifications and variations which fall within the scope of the appended claims.

What is claimed is:

1. A parameter optimization method for real-time optimization of parameters related to control processing by a control system which controls a controlled object in an environment in which control conditions change dynamically, the method comprising:
   a first step of setting an acquisition range of operation information about operation of the controlled object when calculating an initial evaluated value, based on a statistical model created in the past and stored in a storage medium;
   a second step of acquiring the operation information in a current environment;
   a third step of calculating an evaluated value to evaluate results of the control processing based on the acquired operation information obtained in the second step;
   a fourth step of creating a current statistical model using the calculated evaluated value as an explained variable, and the corresponding operation information as an explanatory variable;
   a fifth step of storing the created current statistical model in the storage medium;
   a sixth step of calculating estimated values of parameters which provide an optimum solution to the current statistical model stored in the storage medium in the fifth step; and
   a seventh step of updating the parameters used for the control processing based on the calculated estimated values of the parameters; wherein
   the parameters are optimized in real time through repetition of the second to seventh steps at predetermined time intervals after execution of the first step.

2. The parameter optimization method according to claim 1, wherein the acquisition range used to calculate the initial evaluated value is set to include an optimum solution to the statistical model created in the past.

3. The parameter optimization method according to claim 1, wherein the current statistical model is generated in the fourth step using one of a weighted least squares method and a robust estimation method.

4. The parameter optimization method according to claim 3, wherein a genetic algorithm is used as a solution to the robust estimation method.

5. The parameter optimization method according to claim 1, wherein the controlled object is one of a marine vessel, an aircraft, and an automobile.

6. The parameter optimization method according to claim 1, wherein the control system is one of a system for navigation speed control or attitude control in a marine vessel, a system for flying speed control or attitude control in an aircraft, and a system for travel speed control or vehicle distance control in an automobile.

7. The parameter optimization method according to claim 1, wherein the operation information includes at least information about a trim angle of a marine vessel.

8. The parameter optimization method according to claim 1, wherein the evaluated value that is calculated in the third step is the value of at least one of a trim angle and an engine speed of a marine vessel.

9. A parameter optimization apparatus for real-time optimization of parameters related to control processing by a control system which controls a controlled object in an environment in which control conditions change dynamically, the apparatus comprising:
   acquisition range setting means for setting an acquisition range of operation information about operation of the controlled object when calculating an initial evaluated value, based on a statistical model created in the past and stored in a statistical model storage means;
   operation information acquisition means for acquiring the operation information in a current environment;
   evaluated-value calculation means for calculating an evaluated value to evaluate results of the control processing based on the operation information acquired by the operation information acquisition means;
   statistical model creation means for creating a current statistical model using the evaluated value calculated by the evaluated-value calculation means as an explained variable, and the corresponding operation information as an explanatory variable;
   the statistical model storage means for storing the statistical model created by the statistical model creation means;
   estimated value calculation means for calculating estimated values of the parameters which provide an optimum solution to the current statistical model stored in the statistical model storage means; and
   parameter updating means for updating the parameters used for the control processing based on the estimated values of the parameters calculated by the estimated value calculation means.

10. The parameter optimization apparatus according to claim 9, wherein the acquisition range used to calculate the initial evaluated value is set by the acquisition range setting means to include an optimum solution to the statistical model created in the past.

11. The parameter optimization apparatus according to claim 9, wherein the statistical model creation means generates the current statistical model using one of a weighted least squares method and a robust estimation method.

12. The parameter optimization apparatus according to claim 11, wherein the statistical model creation means uses a genetic algorithm as a solution to the robust estimation method.

13. The parameter optimization apparatus according to claim 9, wherein the controlled object is one of a marine vessel, an aircraft, and an automobile.

14. The parameter optimization apparatus according to claim 9, wherein the control system is one of a system for navigation speed control or attitude control in a marine vessel, a system for flying speed control or attitude control in an aircraft, and a system for travel speed control or vehicle distance control in an automobile.

15. The parameter optimization apparatus according to claim 9, wherein the operation information includes at least information about a trim angle of a marine vessel.

16. The parameter optimization apparatus according to claim 9, wherein the evaluated value that is calculated by the evaluated-value calculation means is the value of at least one of a trim angle and an engine speed of a marine vessel.

17. A marine vessel navigation control apparatus which controls navigation of a marine vessel, wherein the marine vessel navigation control apparatus includes the parameter optimization apparatus according to claim 9 and optimizes parameters related to navigation control of the marine vessel during the navigation of the marine vessel and controls the navigation of the marine vessel using the optimized parameters.

18. A marine vessel navigational control system comprising an outboard device and the marine vessel navigational control apparatus according to claim 17.

19. The marine vessel navigational control system according to claim 18, wherein the outboard device includes an electronic throttle valve defining a thrust regulator and a power trim and tilt unit defining an attitude angle controller.

20. The marine vessel navigational control system according to claim 18, wherein the marine vessel navigation control apparatus includes a constant-speed navigation controller and a trim angle controller.

21. The marine vessel navigational control system according to claim 20, wherein the constant-speed navigation controller includes a target engine speed calculation module which calculates target engine speed based on predetermined input information and an electronic-throttle valve position calculation module which calculates the valve position of an electronic throttle valve according to the calculated target engine speed.

22. The marine vessel navigational control system according to claim 20, wherein the trim angle controller includes an evaluated-value calculation module which calculates evaluated values of the trim angle, an information storage medium which stores operation information and evaluated values by associating them with each other, where the operation information includes at least the trim angle, a statistical model creation module which creates a statistical model using the evaluated values stored in the information storage medium as an explained variable, and the operation information including at least the trim angle as an explanatory variable; and a target trim angle calculation module which calculates a target trim angle based on the statistical model stored in the information storage medium.

23. The marine vessel navigational control system according to claim 18, wherein the marine vessel navigation control apparatus includes a constant-speed navigation controller and a standardization coefficient optimizer for optimizing standardization coefficients used in the current statistical model.

24. The marine vessel navigational control system according to claim 23, wherein the standardization coefficient optimizer includes a standardization coefficient calculation module for determining an optimum standardization coefficient, and the constant-speed navigation controller performs constant-speed navigation control using the newly calculated standardization coefficient.

25. A computer readable medium for storing a computer-executable program for real-time optimization of parameters related to control processing by a control system which controls a controlled object in an environment in which control conditions change dynamically, the computer-executable program causing the control system to perform the following steps including:
   a first step of setting an acquisition range of operation information about operation of the controlled object when calculating an initial evaluated value, based on a statistical model created in the past and stored in a storage medium;
   a second step of acquiring the operation information in a current environment;
   a third step of calculating an evaluated value to evaluate results of the control processing based on the acquired operation information;
   a fourth step of creating a current statistical model using the calculated evaluated value as an explained variable, and the corresponding operation information as an explanatory variable;
   a fifth step of storing the created current statistical model in the storage medium;
   a sixth step of calculating estimated values of the parameters which provide an optimum solution to the stored current statistical model; and
   a seventh step of updating the parameters used for the control processing based on the calculated estimated values of the parameters; wherein
   the parameters are optimized in real time through repetition of the second to seventh steps at predetermined time intervals after execution of the first step.

26. The computer readable medium for storing a computer-executable program according to claim 25, wherein the acquisition range used to calculate the initial evaluated value is set to include an optimum solution to the statistical model created in the past.

27. The computer readable medium for storing a computer-executable program according to claim 25, wherein the current statistical model is generated in the fourth step using one of a weighted least squares method and a robust estimation method.

28. The computer readable medium for storing a computer-executable program according to claim 27, wherein a genetic algorithm is used as a solution to the robust estimation method.

29. The computer readable medium for storing a computer-executable program according to claim 25, wherein the controlled object is one of a marine vessel, an aircraft, and an automobile.

30. The computer readable medium for storing a computer-executable program according to claim 25, wherein the control system is one of a system for navigation speed control or attitude control in a marine vessel, a system for flying speed control or attitude control in an aircraft, and a system for travel speed control or vehicle distance control in an automobile.

31. The computer readable medium for storing a computer-executable program according to claim 25, wherein the operation information includes at least information about a trim angle of a marine vessel.

32. The computer readable medium for storing a computer-executable program according to claim 25, wherein the evaluated value that is calculated in the third step is the value of at least one of a trim angle and an engine speed of a marine vessel.

* * * * *